(12) United States Patent
Köller

(10) Patent No.: US 8,423,951 B1
(45) Date of Patent: Apr. 16, 2013

(54) SYSTEMS AND/OR METHODS FOR IDENTIFYING CORRESPONDING ELEMENTS IN DIFFERENT MODELS

(75) Inventor: Lars Köller, Saarbrücken (DE)

(73) Assignee: Software AG, Darmstadt (DE)

( * ) Notice: Subject to any disclaimer, the term of this patent is extended or adjusted under 35 U.S.C. 154(b) by 2 days.

(21) Appl. No.: 13/307,805

(22) Filed: Nov. 30, 2011

(51) Int. Cl.
*G06F 9/44* (2006.01)

(52) U.S. Cl.
USPC .......................................................... 717/104

(58) Field of Classification Search .................. 717/104, 717/107, 108
See application file for complete search history.

(56) References Cited

U.S. PATENT DOCUMENTS

| | | | |
|---|---|---|---|
| 8,001,552 B1* | 8/2011 | Chickneas | 719/313 |
| 2008/0046864 A1 | 2/2008 | Bai et al. | |
| 2009/0060347 A1* | 3/2009 | Kageura | 382/203 |
| 2010/0088676 A1* | 4/2010 | Yuan et al. | 717/120 |
| 2011/0218785 A1* | 9/2011 | Nouxet et al. | 703/2 |

OTHER PUBLICATIONS

ARIS Business Architect & Designer—Easy to Use Design Tool [online] [retrieved Nov. 30, 2011] http://www.softwareag.com/corporate/products/aris_platform/aris_design/business_architect/capabilities/default.asp.
BONAPart 3 Referenz-Handbuch, p. 472 (with English-Language Translation) [online] [retrieved Nov. 30, 2011] http://www.mherzog.com/HOME/4_MoCo07/E-M-Commerce/BONAPART%203%20Referenz-Handbuch.pdf.
ADONIS Community Edition Help Screen: Image 1, [retrieved Nov. 30, 2011].
ADONIS Community Edition Help Screen: Image 2, [retrieved Nov. 30, 2011].
How to Create Flexible Organization Charts in Visio, pp. 2-5 [online] [retrieved Nov. 30, 2011] http://support.microsoft.com/kb/301576.

* cited by examiner

*Primary Examiner* — Anna Deng
(74) *Attorney, Agent, or Firm* — Nixon & Vanderhye PC

(57) ABSTRACT

Certain example embodiments relate to systems and/or methods for identifying corresponding elements in different models (e.g., two or more different models), where multiple non-unique elements are connected with one another. The techniques of certain example embodiments are suitable for comparing the different models and identifying corresponding elements, regardless of whether the different models are different versions of one another, represent transformed and/or merged models, and/or were copied and subsequently modified from a source model. The techniques also advantageously leverage a more deterministic approach that is more consistent across different comparisons and when the source and target models are swapped.

26 Claims, 21 Drawing Sheets

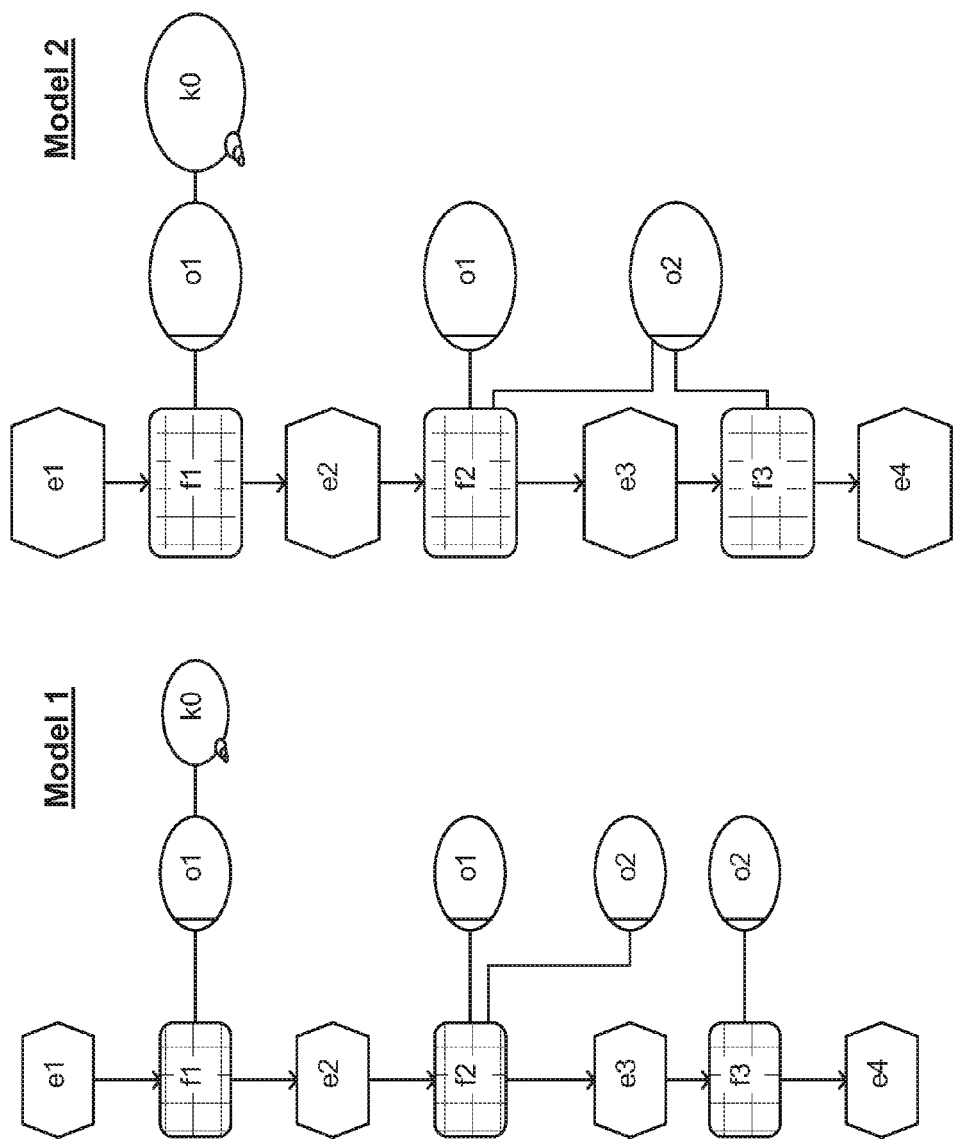

SYSTEMS AND/OR METHODS FOR IDENTIFYING CORRESPONDING ELEMENTS IN DIFFERENT MODELS

FIELD OF THE INVENTION

Certain example embodiments described herein relate to systems and/or methods for identifying corresponding elements in different models. More particularly, certain example embodiments described herein relate to systems and/or methods for identifying corresponding elements in different models (e.g., two different models), where multiple non-unique elements are connected with one another.

BACKGROUND AND SUMMARY OF EXAMPLE EMBODIMENTS OF THE INVENTION

A "model" generally describes one or more complex application artifacts (e.g., business processes, data structures, structure and behavior of software systems or other technical and/or business components, etc.) in a formalized fashion. A model can use modeling primitives and/or conventions of a well-defined "abstract language," which oftentimes is referred to as a metamodel. Some common metamodels are the UML family of modeling languages (e.g., UML class diagrams, UML collaboration diagrams, etc.), the BPMN metamodel, the ARIS family of modeling languages (EPC, VAC, FAD, etc.), the entity-relationship (meta)model (ERM), the relational (meta)model, etc. A metamodel, being an abstract language, may be thought of as a collection of modeling elements that can be used or "instantiated" to describe the actual models. For instance, in a UML class diagram, modeling elements include classes, associations, properties, etc., whereas the model elements in the relational model include relations and their attributes. These modeling elements can be arranged in a variety of well-defined ways to build formal models representing potentially complex business and/or technical processing or other flows.

A metamodel is in principle independent of a concrete notation and therefore may be thought of as an "abstract language," as indicated above. For instance, a metamodel may define only the language concepts and the rules for their use to form a valid model for the metamodel itself. To do actual modeling with a metamodel, however, a concrete notation is required. Notations of metamodel elements include, for example, boxes with three "compartments" that represent UML classes, labeled rectangles and diamonds used to represent entities and relationships in the ERM, etc.

A common trait of many metamodels is that corresponding models can be represented as a graph including nodes and edges, which collectively can be referred to as the graph's "elements." Computer systems handling different "kinds" of models (e.g., so-called model management systems) often use some kind of graph model as internal representation for all kinds of models.

There are many circumstances in which it would be desirable to compare two or more different models with one another. For instance, it might be desirable to compare two or more different models with one another during model merging, for version control purposes, when model development is performed by multiple users, etc. It is possible to use certain existing tools for model comparison purposes.

Unfortunately, however, it oftentimes is difficult to compare multiple different arbitrary models. In other words, while it is relatively straightforward to compare identical elements in different models where there is only one element with a given comparison-identifier (e.g., an element name) in each model, it is considerably more difficult to identify corresponding elements when there is more than just one object with the same name in the different models.

The assignee of the instant invention has implemented a model comparison tool within its ARIS Business Architect system. However, this comparison tool was implemented with a view towards comparing model-versions as opposed to comparing arbitrary models. As a result, it simply compared the unique ARIS-Object-ID (OID) of the different elements. This comparison is always unique, even if there are many elements with the same comparison-identifier. The problems associated with comparing arbitrary models therefore were not completely solved. In this regard, in the existing solution, for identifying corresponding elements, a user could only identify elements if all of their neighbors were unique from the beginning, or if the non-unique elements had the same size and top/left position. These conditions are very rarely fulfilled because of the nature of the modeling process.

Thus, it will be appreciated that there is a need in the art for an improved model-comparison tool that has a better identification algorithm. For instance, it will be appreciated that there is a need in the art for an improved model-comparison tool that handle comparisons between multiple arbitrary models, e.g., where multiple non-unique elements are connected with one another.

One aspect of certain example embodiments relates to a model comparison tool that works even when an occurrence-definition concept is applied and/or the ability to place multiple elements of same type and with same name in a model is enabled.

Another aspect of certain example embodiments relates to techniques for allowing a user to meaningfully compare models in cases where not all neighbors of a non-unique element are unique from the beginning.

Another aspect of certain example embodiments relates to a more deterministic approach to considering two or more different models, with those models potentially including multiple non-unique elements that are connected with one another.

In certain example embodiments, a computer-implemented method for comparing first and second computer-represented models is provided. Each said model has a plurality of elements and each said element has a (comparison)-identifier (e.g., the name-attribute or the GUID of the object definition in ARIS models). Sets of elements are built from the first and second models such that all elements in a given set have identical (comparison)-identifiers. For each set of elements: when the set includes exactly one element from each of the first and second models, these elements are marked as corresponding with one another; when the set includes at least one entry for the first model and no entries for the second model, the at least one entry for the first model is/are marked as having been deleted; and when the set includes at least one entry for the second model and no entries for the first model, the at least one entry for the second model is/are marked as having been added. However, when the set includes more than one element for either or both of the first and second models, for each element in the set from the first model an additional (e.g., unique) identifier (e.g., the OID, at least in the ARIS environment) of the element in the set from the first model is compared to all additional (unique) identifiers of the elements in the set from the second model. Then, when there is exactly one element from the second model that has the same additional (unique) identifier as the identifier of the element from the first model, the first and second elements are marked as corresponding with one another and the method proceeds to the next element in the set from the first model, if any. However, in situations where (i) there are no elements from the second model set that have the same additional (unique) identifier as the identifier of the element from the first model, and in situations where (ii) there are multiple elements from the second model that have the same additional identifier as the identifier of the element from the first model, a sub-process is performed, with the sub-process including: comparing a position of the element from the first model when positions of the elements from the second model, if any; when there is exactly one element from the second model that has the same position as the element from the first model, marking the first and second elements as corresponding with one another and proceeding to the next element in the set from the first model, if any; comparing neighbors of the element from the first model (if any) with neighbors of each elements from the second model (if any); determining whether (a1) exactly one element from the second model has more identified neighbors than other elements from the second model and these neighbors correspond to neighbors of the element from the first model; and determining, when part (a1) is not fulfilled, whether (b1) exactly one element of the second model has neighbors that are all identified and the first element also has these neighbors identified as corresponding neighbors. Then, in situations where neither (a1) nor (b1) apply, the process proceeds to the next element in the set from the first model, if any. In situations where (a1) or (b1) applies, a reverse or "vice versa" portion of the sub-process is performed so as to include: determining whether (a2) exactly one element from the first model has more identified neighbors than other elements from the first model and these neighbors correspond to neighbors of the element from the second model; determining, when part (a2) is not fulfilled, whether (b2) exactly one element of the first model has neighbors that are all identified and the second element also has these neighbors identified as corresponding neighbors; in situations where neither (a2) nor (b2) apply, proceeding to the next element in the set from the first model, if any; and in situations where (a2) or (b2) applies, comparing this element from the first model with the actual element from the first model being tested in this iteration and, when they are the same element, marking the element from the first and second models as corresponding to one another, but when this is not the case, proceeding to the next element in the set from the first model, if any. When all sets have been examined, it is determined whether any element could not be identified as corresponding during the last iteration. When at least one correspondence was identified, the iterations are repeated over all sets.

In certain example embodiments, there is provided a non-transitory computer-readable storage medium tangibly storing instructions that, when executed by at least one processor of a modeling system, perform the above-described and/or similar methods.

In certain example embodiments, a modeling system is provided. Processing resources include a processor and a memory. A model repository stores a plurality of computer-based models, with each said model including a plurality of model elements. A user interface is configured to receive user input. The processor is configured to receive user input from the user interface. When the user input indicates that the processing resources are to retrieve first and second models from the model repository and compare the two, the comparison is performed by executing instructions corresponding to the above-described and/or similar methods.

According to certain example embodiments, at least some of the identifiers are non-unique within a given model.

According to certain example embodiments, the positions that are compared are center positions of the elements.

According to certain example embodiments, a layout or design template is applied to the first and/or second models to provide a consistent orientation as between the models.

According to certain example embodiments, the second model is a different version of the first model, created from a merge operation performed on the first model, or a copy and subsequent alteration of the first model.

According to certain example embodiments, a display is configured to display one or more models in the model repository when the user input receives user input requesting a corresponding display, and is further configured to display results of the comparisons.

According to certain example embodiments, the techniques described above may be extended to accommodate comparisons between more than two models.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to systems and/or methods for identifying corresponding elements in different models (e.g., two different models), e.g., where multiple non-unique elements are connected with one another.

Figure 1:
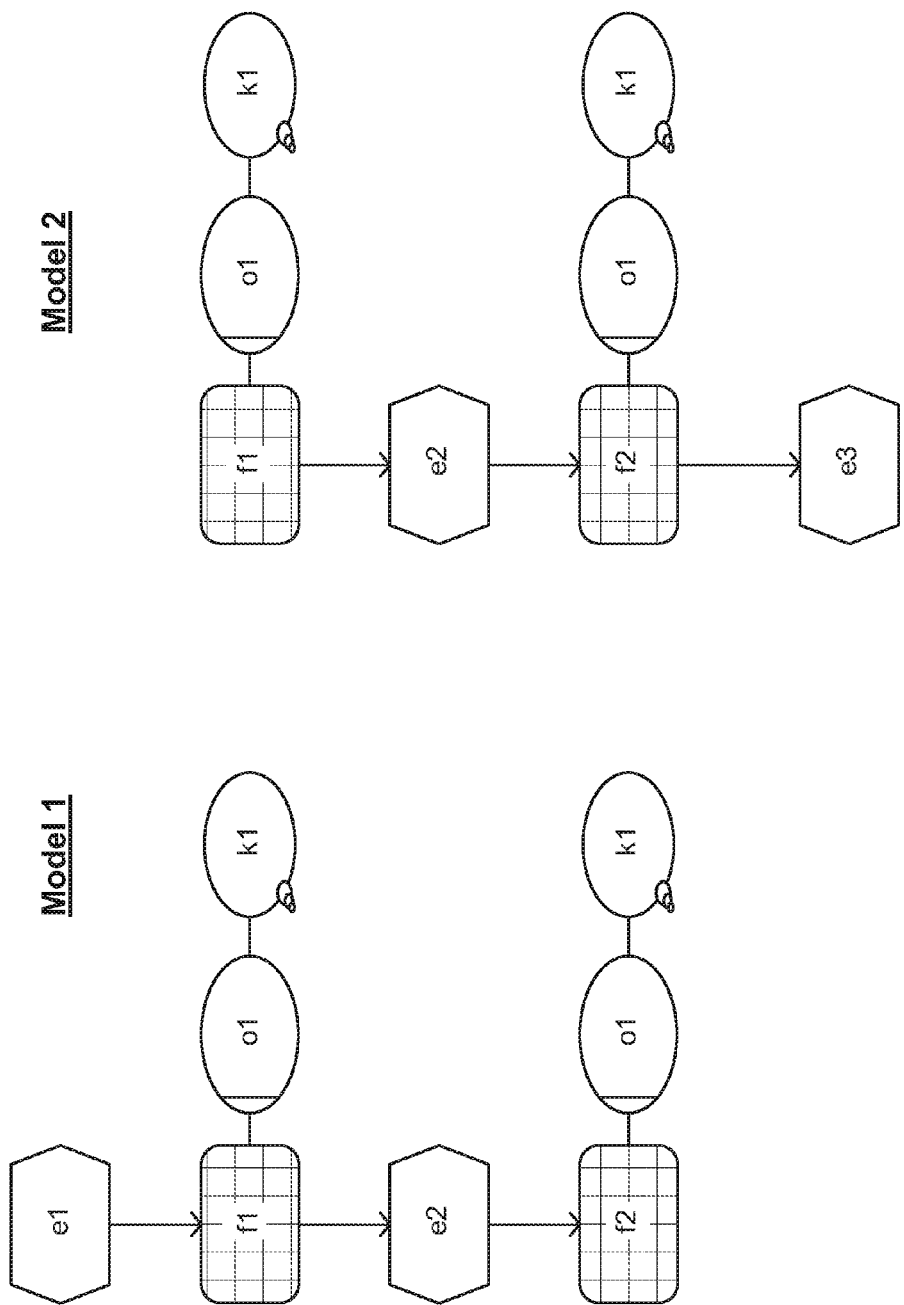
FIG. 1 shows two example models that will be compared with one another using techniques according to certain example embodiments.
Figure 2:
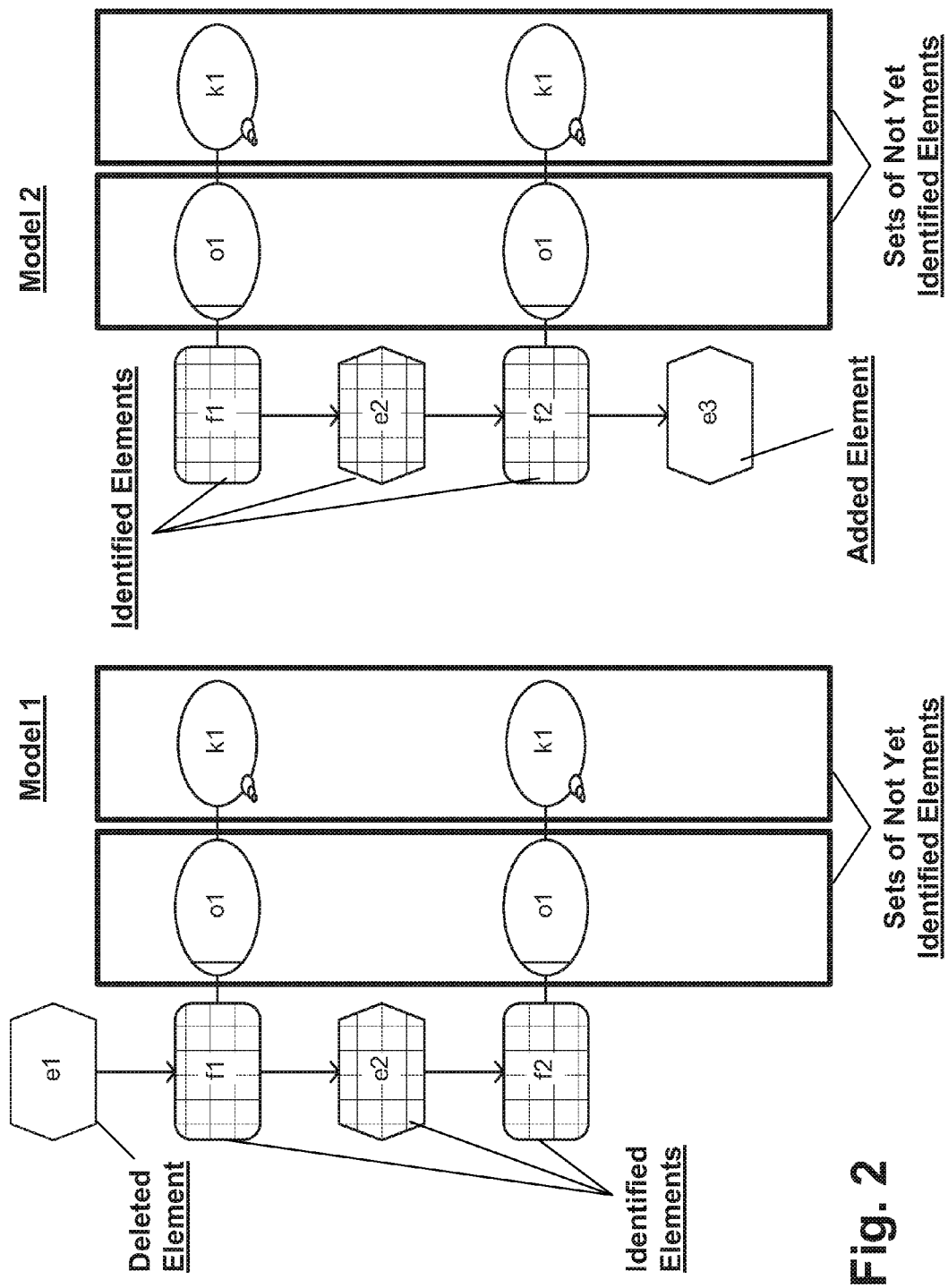
FIG. 2 shows what happens when a first part of certain example approaches described herein is applied to the FIG. 1 example.
Figure 3:
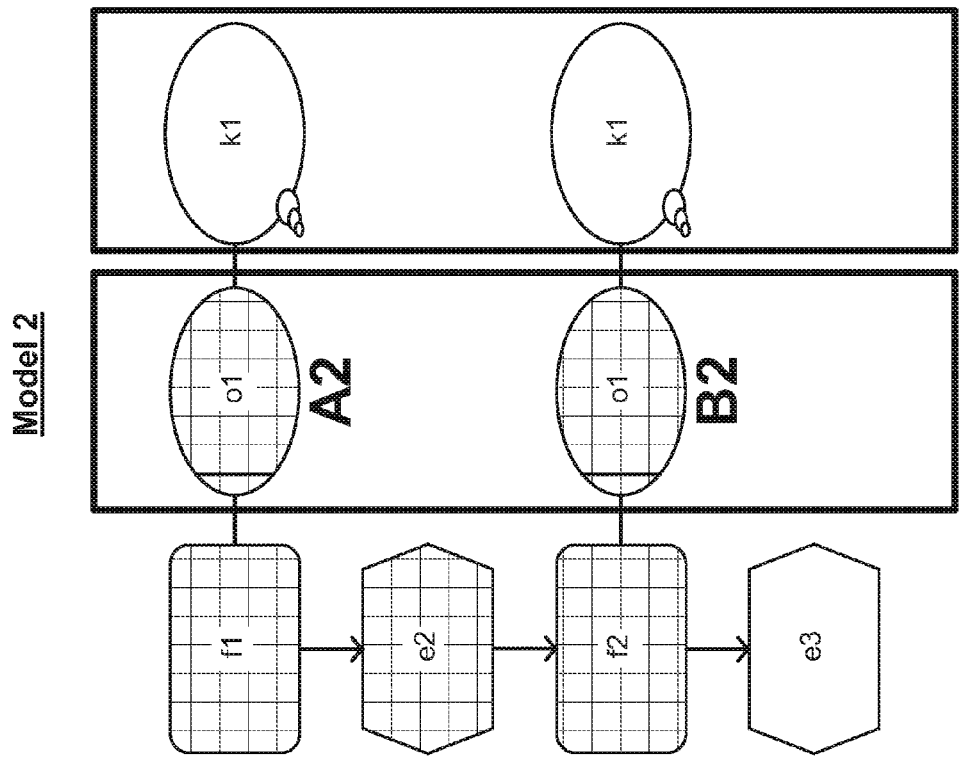
FIGS. 3-4 show further progress in the example approach described herein in connection with the FIG. 1 example.
Figure 3:
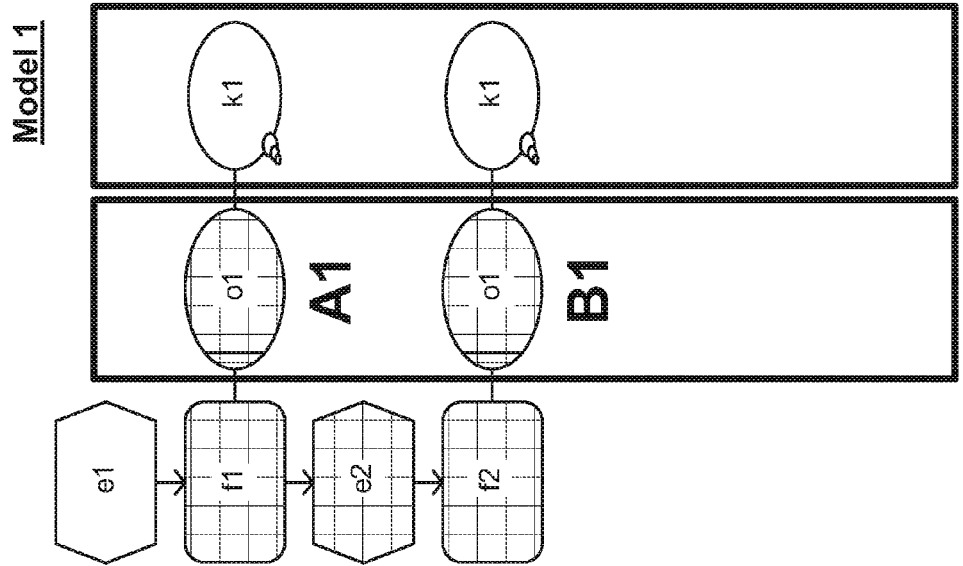
Figure 4:
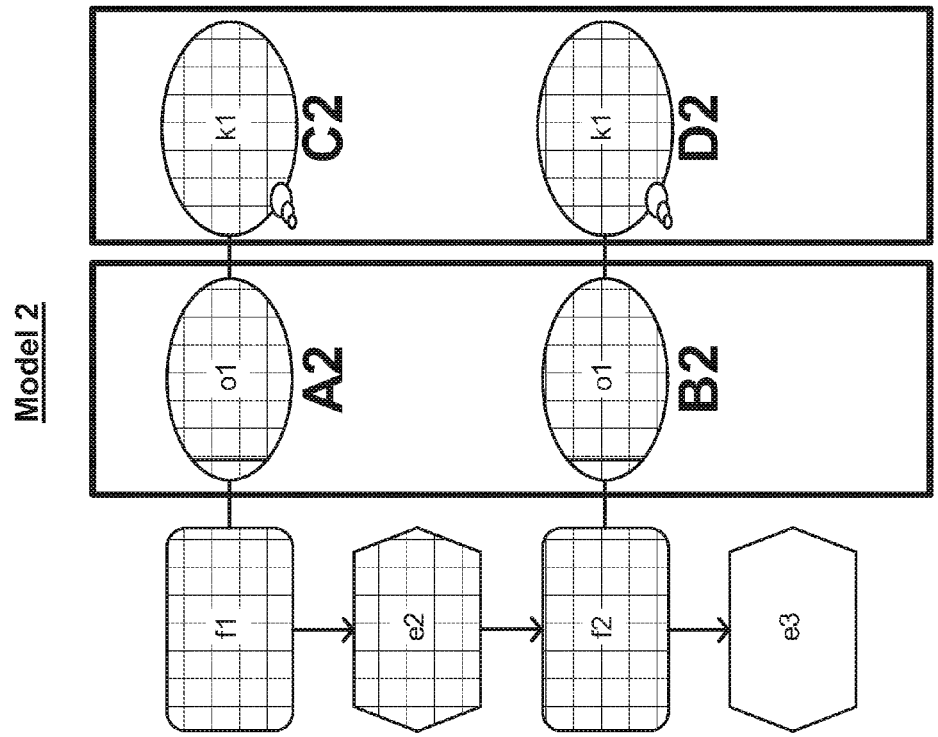
Figure 4:
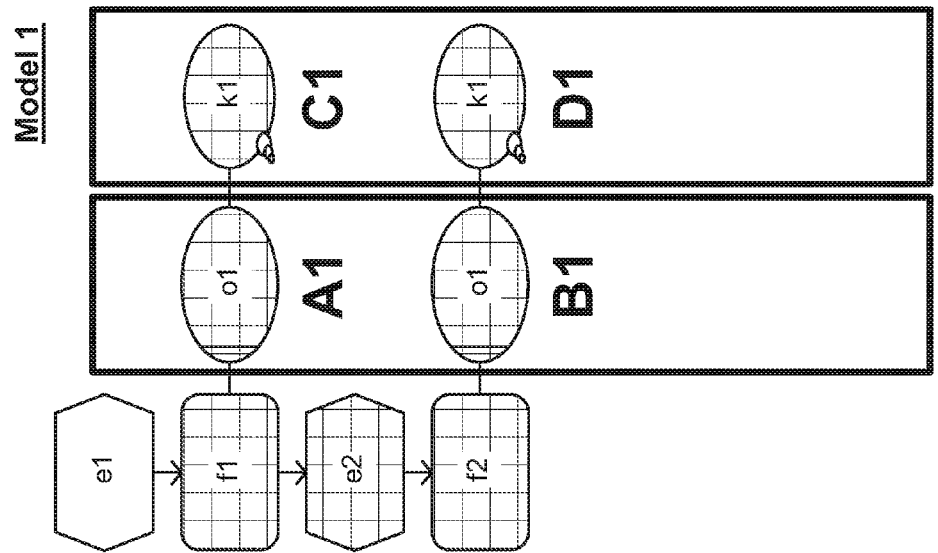
Figure 5A:
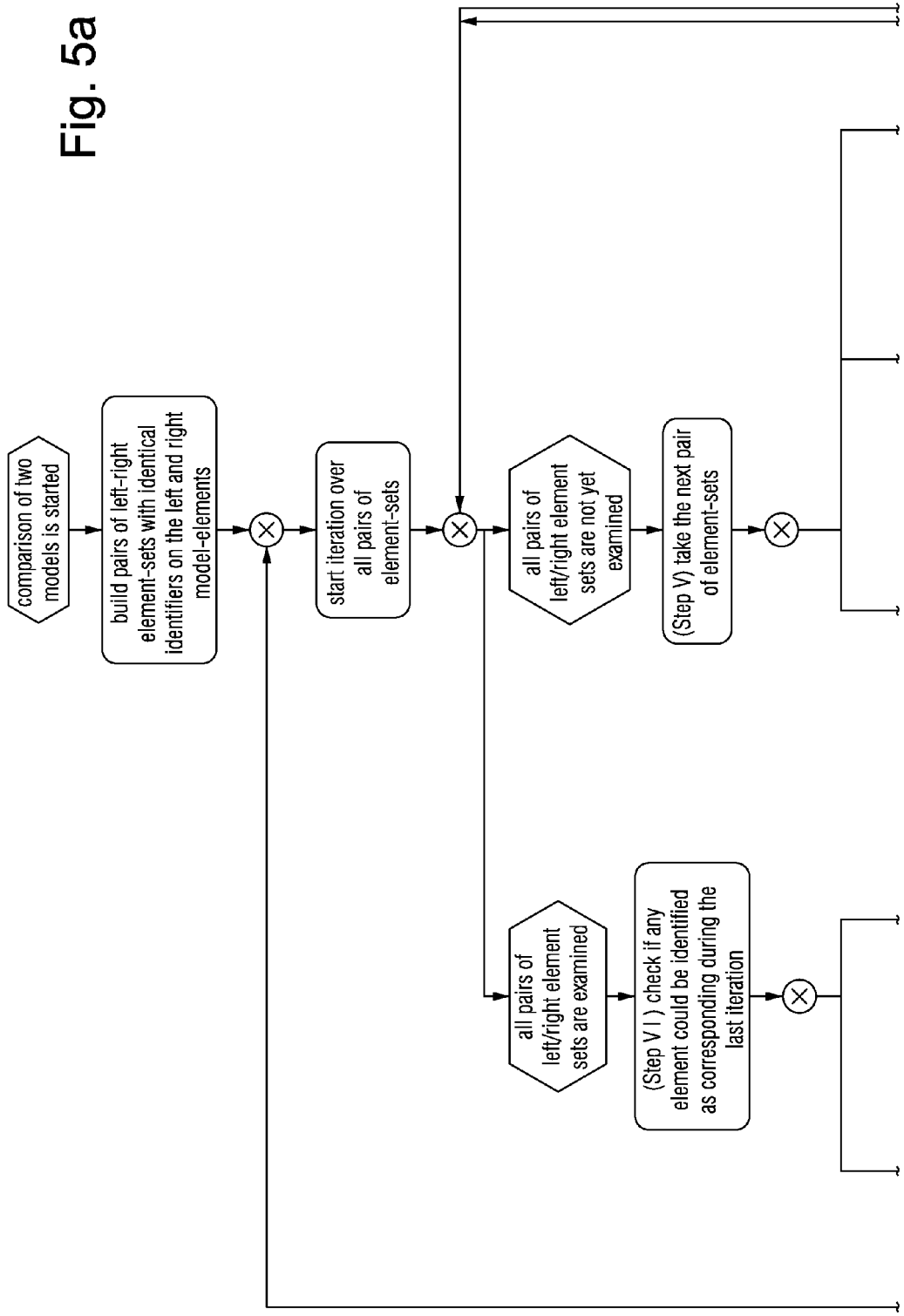
FIGS. 5a-5e show a flowchart that shows the algorithm of certain example embodiments.
Figure 5B:
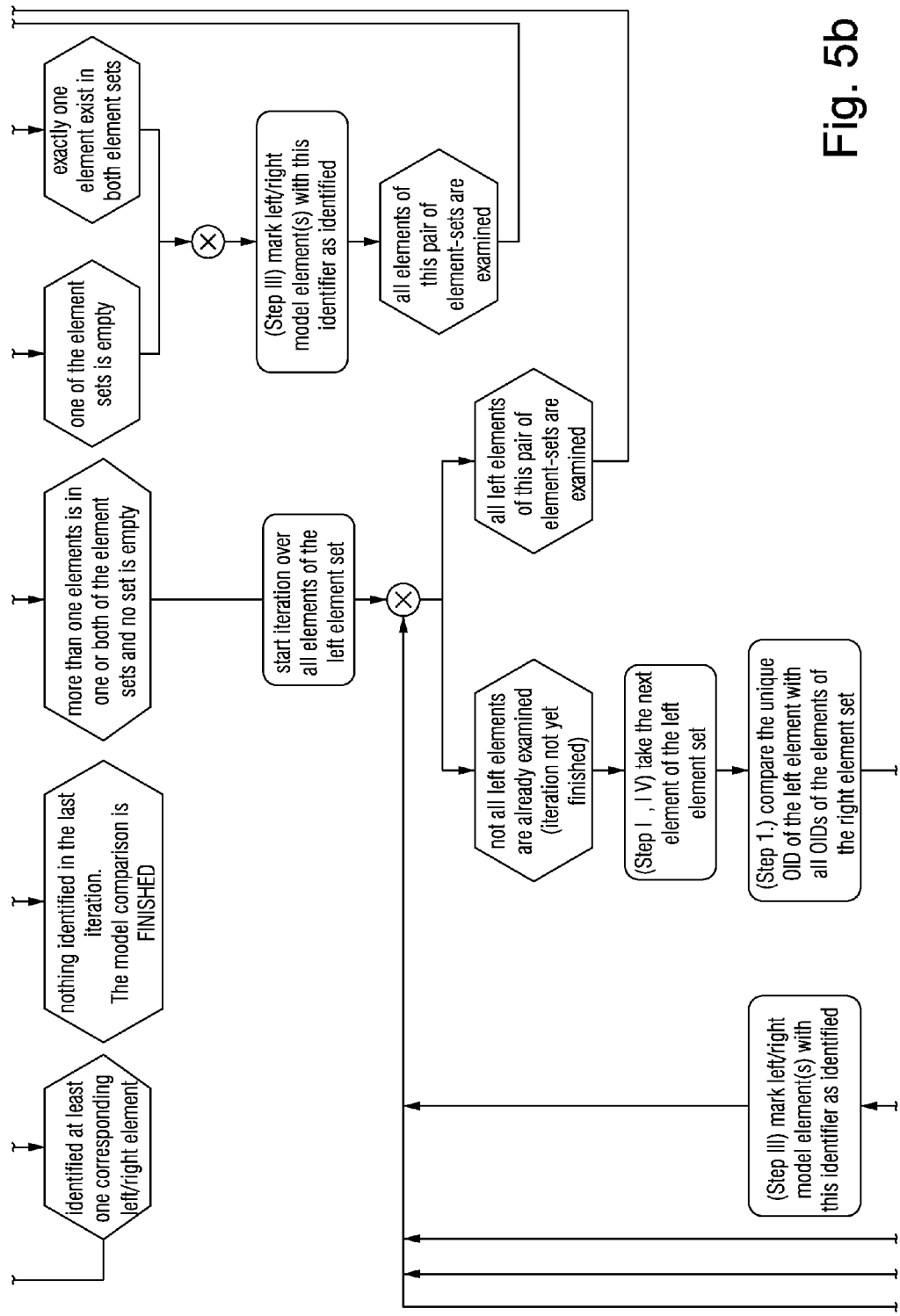
Figure 5C:
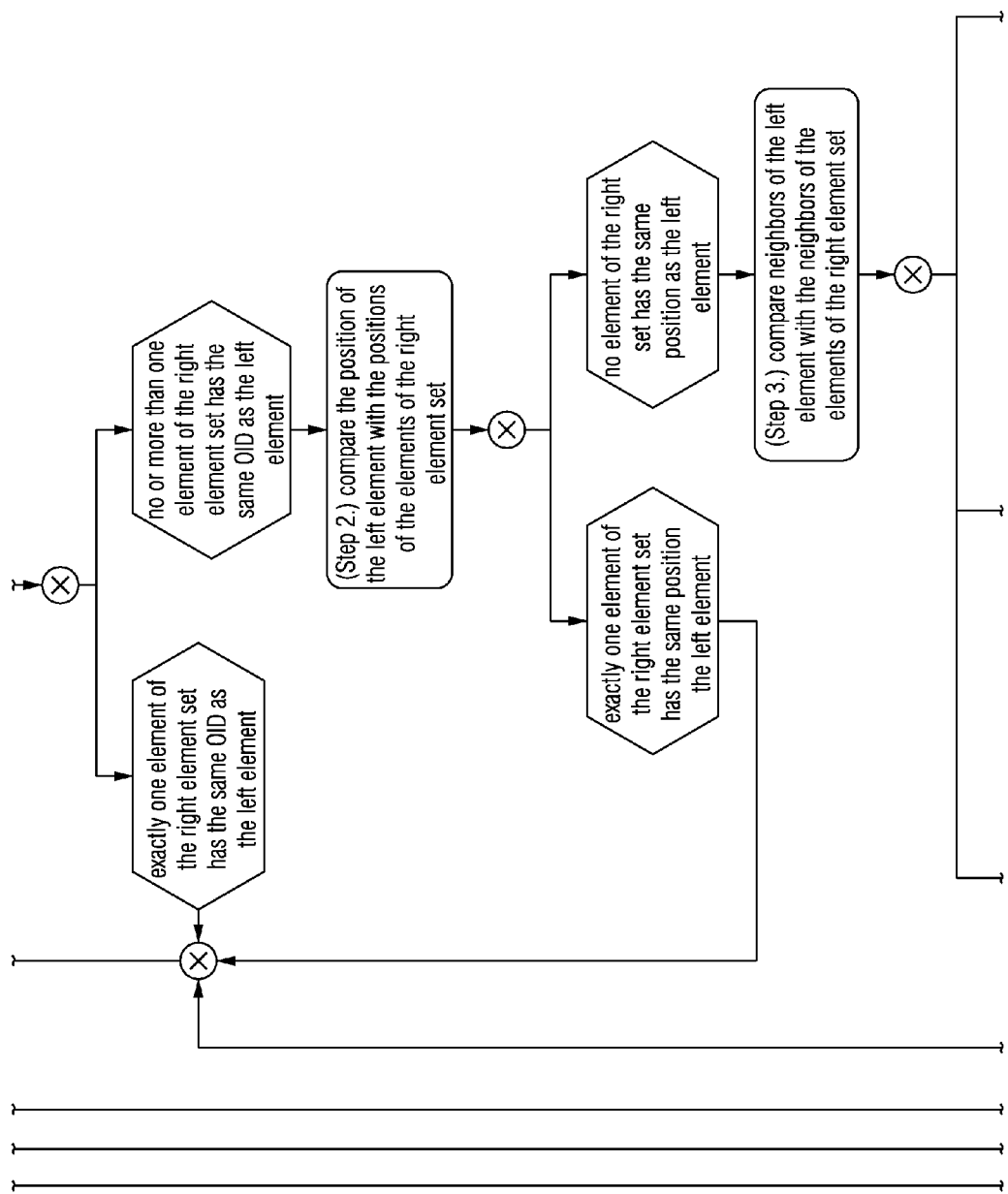
Figure 5D:
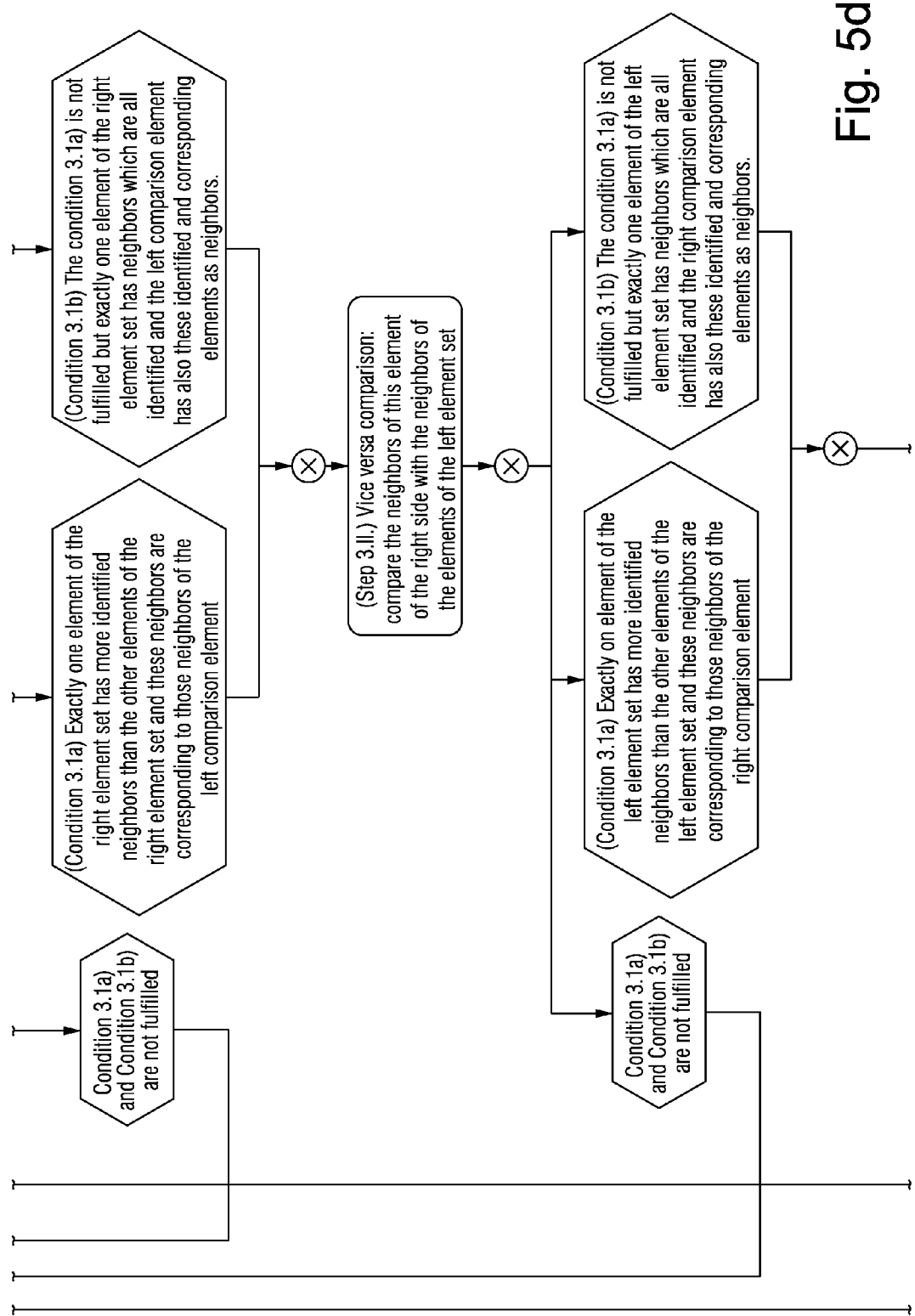
Figure 5E:
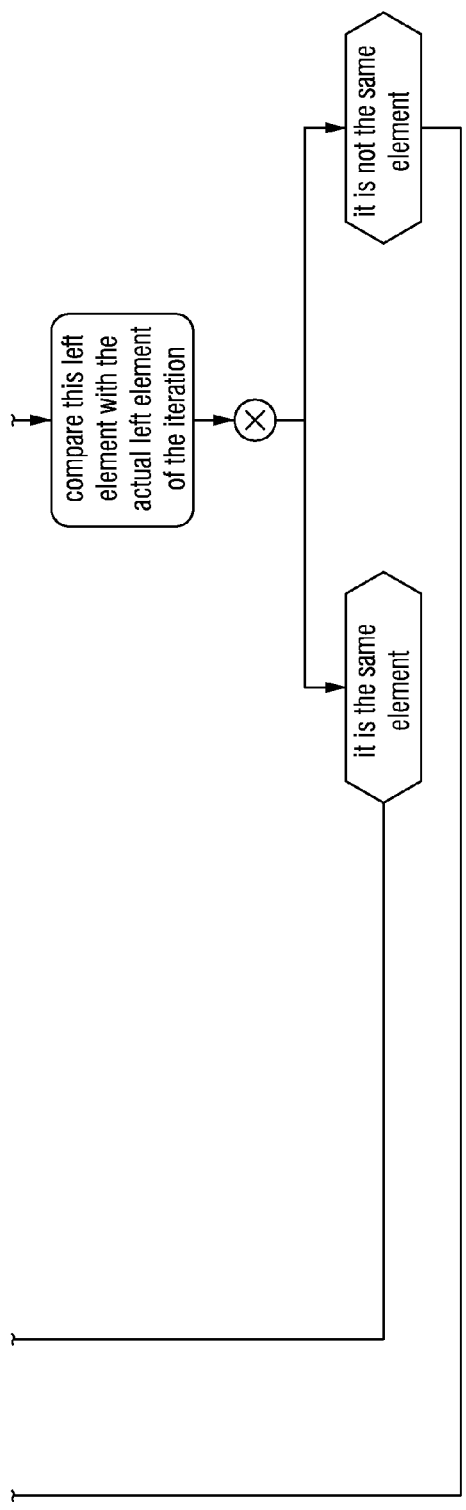

FIG. 1 shows two example models that will be compared with one another using techniques according to certain example embodiments, and FIGS. 2-4 help illustrate how certain example embodiments may operate. FIGS. 5a-5e show a flowchart that shows an algorithm of certain example embodiments and generalizes the discussion provided in connection with FIGS. 1-4 and below.

In order to compare the two different models in the FIG. 1 example, it is determined which element of the left model corresponds to which element of the right model. To facilitate identifying such left-right element pairs, an identifier may be consulted. In ARIS models, for example, the GUID of the object definition may be used as a suitable identifier. In other examples, an arbitrary text-attribute (e.g., the name-attribute) may be used as an identifier.

Thus, certain example embodiments may first identify corresponding left-right elements by their identifiers. In such a case, this step may involve building pairs of left-right element-sets where the identifiers of the right and left model elements are identical. From the FIG. 1 example, this step would produce pairs of the left-right model elements (e2)-(e2), (f1)-(f1), (f2)-(f2). For the elements e1 and e3, pairs with an empty set on the first or second side—(e1)-( )) and ( )-(e3)—would be obtained. Elements of pairs with an empty set on one side can be directly marked as new/deleted. For the elements o1 and k1, pairs with more than one element in the first and/or second pair set are obtained. More particularly, for o1 and k1, two elements in the left model and two elements in the right model are obtained—namely, pairs (o1, o1)-(o1, o1) and (k1, k1)-(k1, k1).

All pairs that contain exactly one element in the first and second set now contain identified elements. The other pairs contain elements that may be examined by further steps. As a result of this first example step, then, certain elements in the left model have been identified with their corresponding elements in the right model, and certain elements have been identified as deleted or new. There also are two pairs of elements that are not yet identified. FIG. 2 shows the result of applying this first example step to the illustration from FIG. 1. Identified, deleted, added, and sets of not yet identified elements are labeled as such in the FIG. 2 example drawing.

A second example step may be divided into three constituent parts and may be used to help identify elements that are not unique by their identifiers in one or both models. In a first sub-step, since every object occurrence has a unique OID (at least in the ARIS environment), it is possible to compare the OIDs of the left and right elements. If an element in the first set is found to have the same OID as an element of the second set, then these two elements may be considered corresponding elements. If not all elements of the left-right element sets can be identified by this sort of OID-comparison, then those elements can be compared in the second sub-step.

In the example discussed above, the OIDs of all "o1" elements of the left model are compared with all OIDs of the "o1" elements in the right model. Similarly, the OIDs of the left "k1" elements are compared with the OIDs of the right "k1" elements. It is noted that this threshold OID-comparison may only work if the ARIS models are versioned (e.g., same model, but different versions of the model), or if the second model is created by a merge from the first model. In other cases (e.g., occurrence/definition copy of the model, model generation, etc.), the OIDs of the first model's elements may not correspond to the OIDs of the elements from the second model.

It has been observed that most models that are compared with one another are created as copies that are then modified. Thus, it may be advantageous to compare the positions of the objects in the second sub-step as a reliable way to help identify corresponding elements. If the position of an element of the first element-set is identical to the position of an element of the second set, then these two elements may be considered corresponding elements.

In the example discussed above, there can be found the corresponding left-right elements "o1" and "k1" by position comparisons. Even if one were to apply different templates to one's models, the center-point of the elements would not necessarily change. Rather, the size and top/left-position would be changed. Accordingly, all elements may be identified after a template change (which may be used, for example, to adjust the color, size and attribute placements of an element). It is noted that this was not possible in the assignee's existing comparison algorithm because the comparison was made between the size and top/left position of the objects, rather than the center-point.

It is noted, however, that after applying a new layout, e.g., after model-generation or after manual moving of elements or after execution of "layout" or "part layout" functionality, this position comparison may fail. If the position comparison does not identify the non-unique elements, then those elements may be tested in accordance with a third sub-step.

In the third sub-step, if the position or size of the elements has been changed, the non-unique elements may be compared by their already identified neighbors.

Still following the example discussed above, as one neighbor of the "o1" elements (function object f1 or f2) is already identified and this neighbor is unique (only one "o1" element in each model has a connection to a "f1" element and exactly one "o1" element has a connection to an element "f2"), it is possible to identify the corresponding "o1"-pairs, which are marked as A and B in FIG. 3.

After the correct corresponding "o1" elements have been identified, it is possible to also identify the corresponding "k1" elements, as all neighbor elements "o1" are identified. The upper left/right "k1" elements are corresponding because they have the corresponding neighbors "o1"/A and the lower "k1" elements are corresponding because they are connected to the corresponding elements "o1"/B. As a result, all elements are now identified as shown in FIG. 4.

Within the third sub-step, corresponding elements still need to be identified in situations where there is more than one element with the same identifier in at least one model. In the example above, it is important to determine that A1 corresponds to A2 and not to B2, and that C1 corresponds to C2 and not to D2. The following example algorithm may be used to accomplish this task:

I. Take the first element (or the next element, if we are already within the iteration of step IV) of the left element set (that is element A1), and compare its neighbors (f1 and k1) with the neighbors of all elements of the right element set (o1 elements A2 and B2). The corresponding element (of element A1) has been found when the following criterions are fulfilled:

A. Exactly one element of the right element set (A2, B2) has more identified neighbors than the other elements of the right element set, and these neighbors are corresponding to those neighbors of the left comparison element (A1). If this condition is fulfilled, go to II, otherwise test condition B.

This criterion is fulfilled in the example because o1/A2 has a connection to f1 and o1/A1 has f1 as identified neighbor as well. Furthermore, o1/B2 has f2 as identified neighbor, but o1/A1 has no connection to f2. Thus, A1 and A2 have one identified corresponding neighbor (f1), whereas A1 and B2 do not have any corresponding neighbor.

B. If condition A is not fulfilled—e.g., there is more than one element of the right element set that has the same number of identified neighbors that are corresponding to the neighbors of the left comparison element (A1)— then test the following condition: Exactly one element of the right element set (A2, B2) has neighbors that are all identified and the left comparison element (A1) also has these identified and corresponding elements as neighbors.

In the above example, this test does not matter because the corresponding element to element A1 has already been found. However, it is noted that this criterion is not satisfied in the example because A2 has an unidentified element k1/C2 and B2 has also an unidentified neighbor (k1/D2).

II. If a pair has been found with two elements (left-right) that possibly correspond to each other, the I.A and I.B criteria from above are tested in reverse. In other words, the identified element of the right element set is taken, and an attempt is made to find a corresponding element in the left element set by testing condition I.A and I.B. If such a left element can be found and it is the same one that the comparison in the other direction was started, these two elements have been identified as being corresponding elements.

In the example, the possibly identified element of the right element set is element A2, and an attempt is made to identify a corresponding element in the left element set (A1, B1). It will be found that element A1 fulfils criterion I.A and, thus, it is possible to say that the two o1 elements A1 and A2 are corresponding elements. In a similar manner, it is possible to identify B1 and B2 as being corresponding elements.

III. The two identified elements are removed from the left and right element set of unidentified elements. If the two left-right element sets contain exactly one element, these two are corresponding elements, as well.

IV. I-III are repeated with the next element (if existing) of the left element set.

V. I-IV are repeated for the next pair of unidentified left-right element sets.

VI. If at least one left-right element pair could be identified as being corresponding elements, I-IV are repeated for all still-unidentified pairs of element-sets.

VII. It is noted that this iteration is important because if an attempt were made to identify the elements k1 in the above example before the o1 elements have been identified, no result will be returned. This is because, at the beginning, all neighbors of the k1 elements are unidentified. However, after the elements o1 have been identified, it is then possible to identify the corresponding elements k1 by I and II above.

Figure 6:
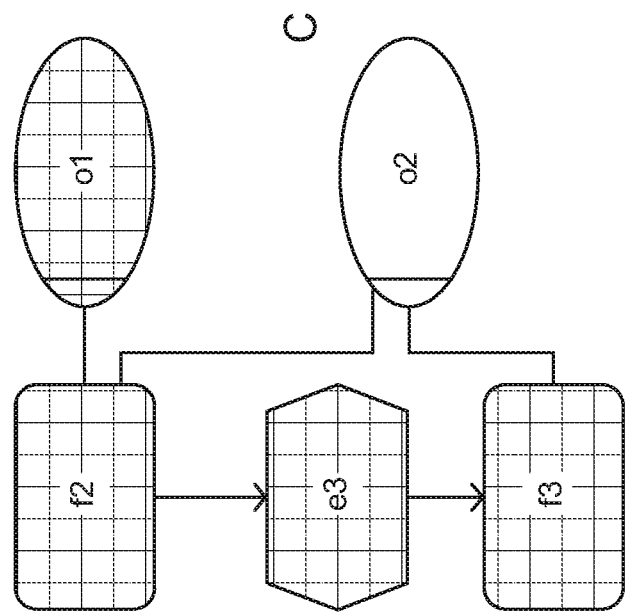
FIGS. 6-7 help explain the "vice versa" or reverse comparison sub-process of certain example embodiments.
Figure 6:
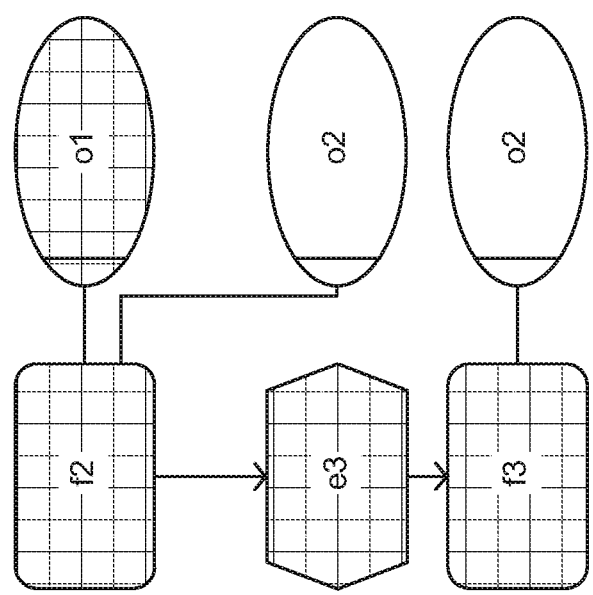
Figure 7:
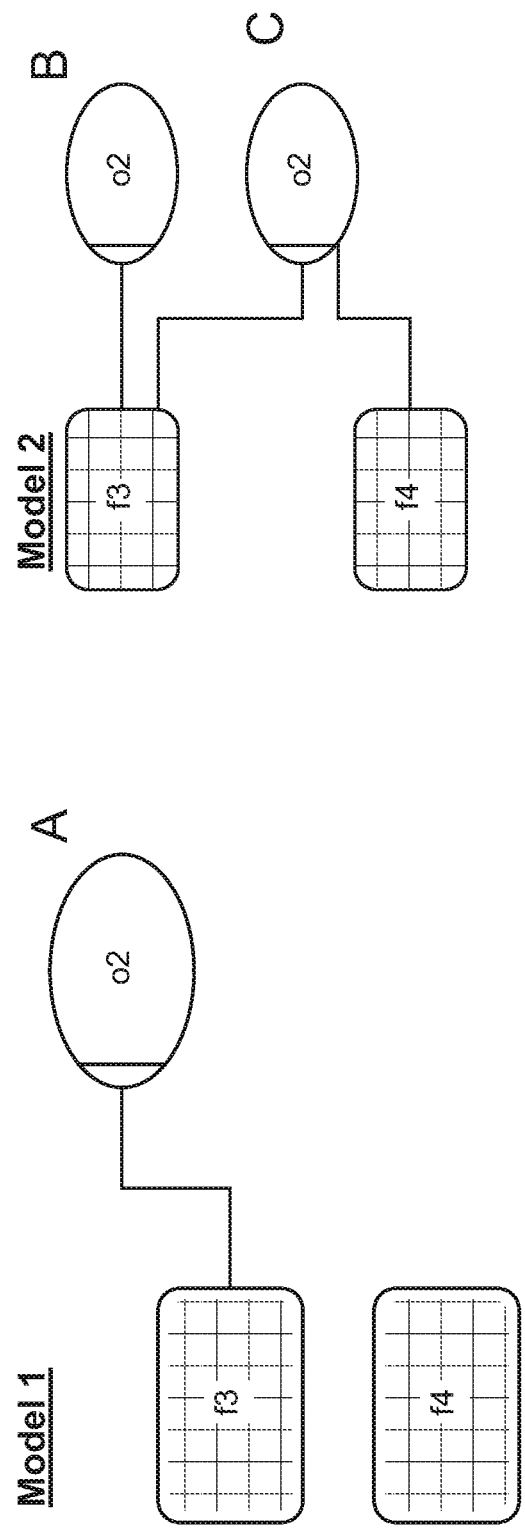

FIGS. 6-7 help explain the "vice versa" or reverse comparison involved discussed above, e.g., in connection with part II. In FIG. 6, the filled in elements in the left and right models are identified elements after sub-steps 1 and 2. In sub-step 3, the o2 element A is compared with element C, and it is determined that criterion I.A is fulfilled, since C is the one and only o2 element of the right model with an identified neighbor (f2) that corresponds to an identified neighbor of element A. But the vice versa or reverse comparison does not fulfill either of the A and B criteria because in the comparison of C with A and C with B it is determined that both elements A and B have exactly one matching neighbor (f2 and f3).

Referring now to FIG. 7, the comparison of elements A and B fulfills criterion I.B but not criterion I.A. Criterion I.A is not fulfilled because both elements B and C have exactly one identified neighbor (f3) that corresponds to the identified neighbor f3 of element A. Because the other comparison direction—the comparison of B and A—fulfills condition I.A/I.B, it is possible to identify the elements A-B as corresponding elements.

Figure 8B:
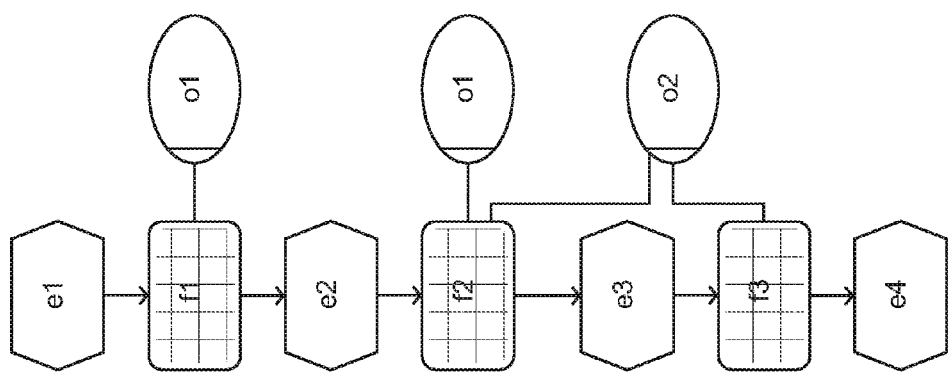
FIGS. 8a-10b provide another illustrative scenario that help demonstrate how certain example embodiments may be used in connection with models including many multiple elements.
Figure 8B:
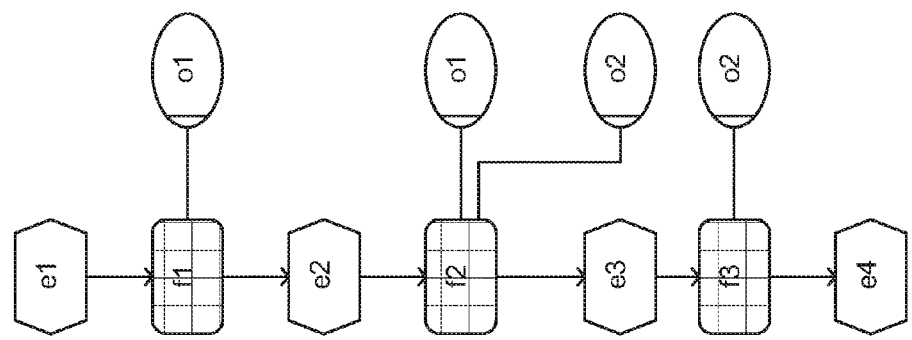
Figure 9A:
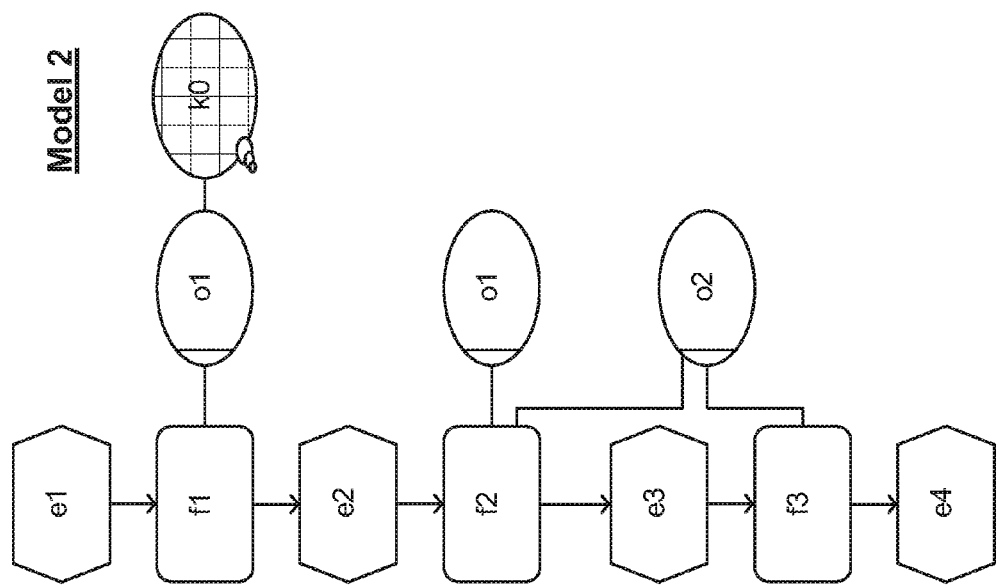
Figure 9A:
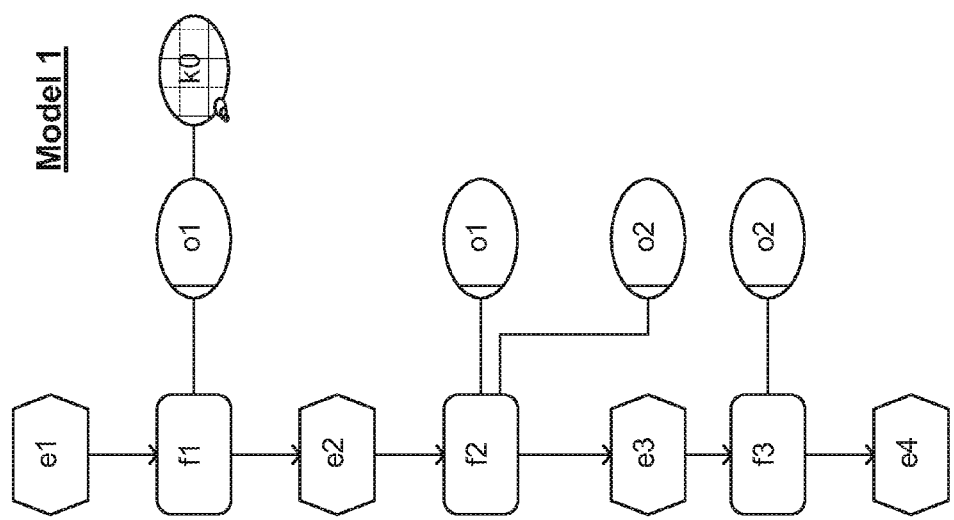
Figure 9B:
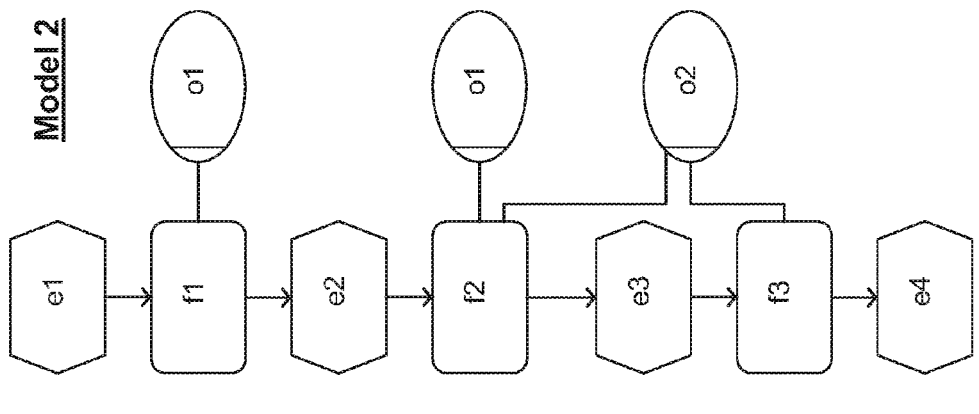
Figure 9B:
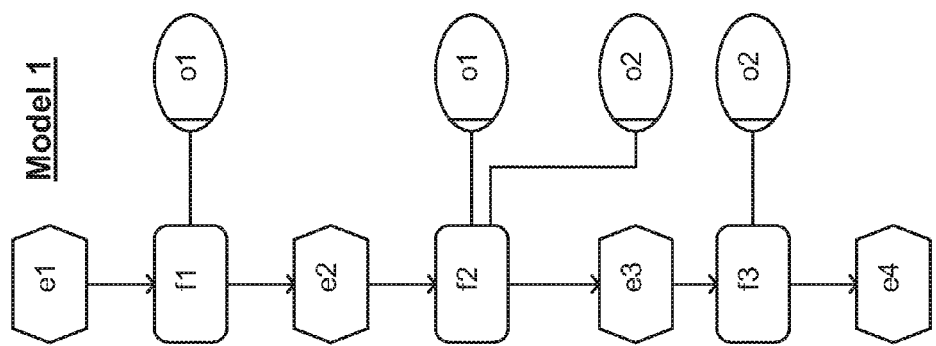

Consider now models with many multiple elements. FIGS. 8*a* and 8*b*, show two sets of example left-right models with each having many multiple elements for comparison. After sub-steps 1 and 2, there is only one identified corresponding element, namely, k0. This is shown in FIGS. 9*a* and 9*b* as the elements k0 being shaded.

Figure 10A:
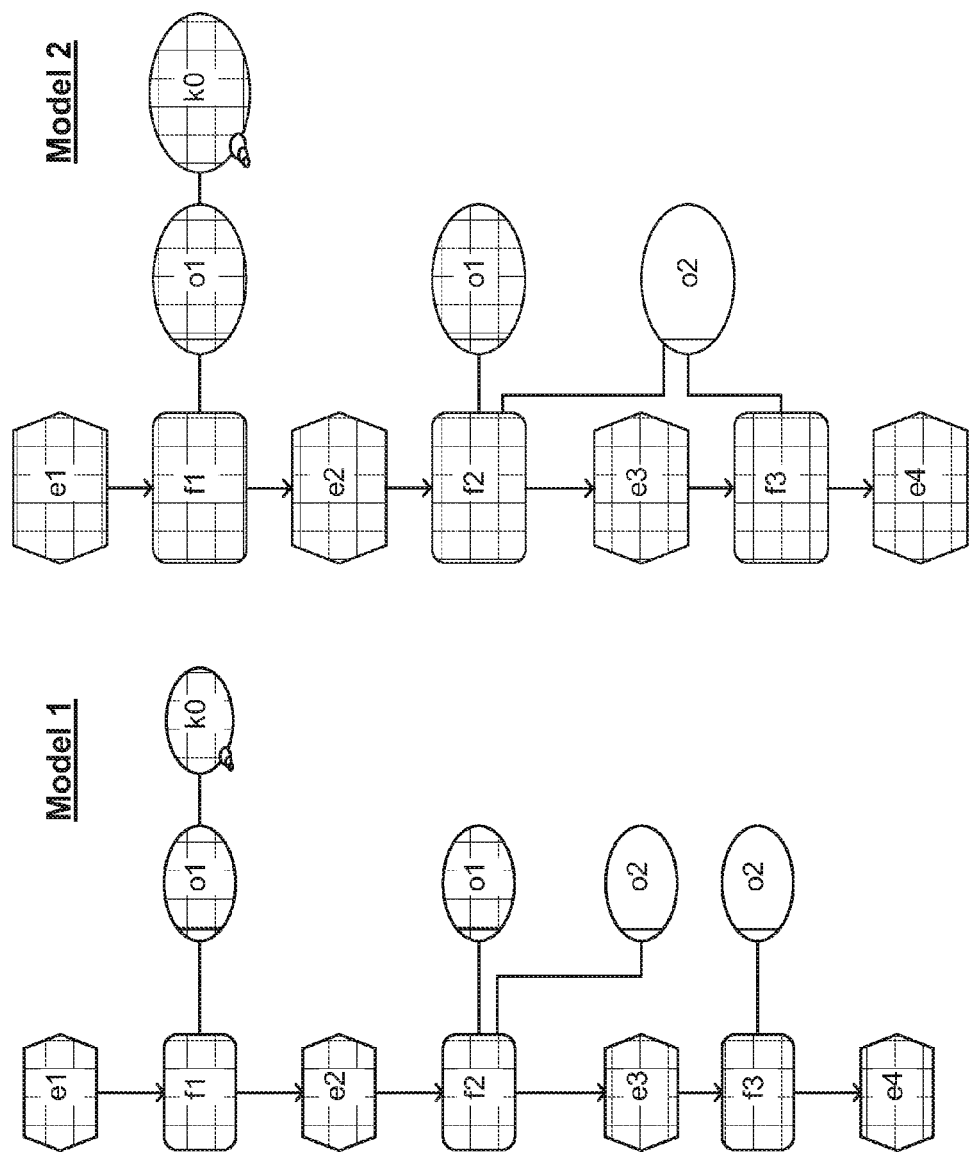
Figure 10B:
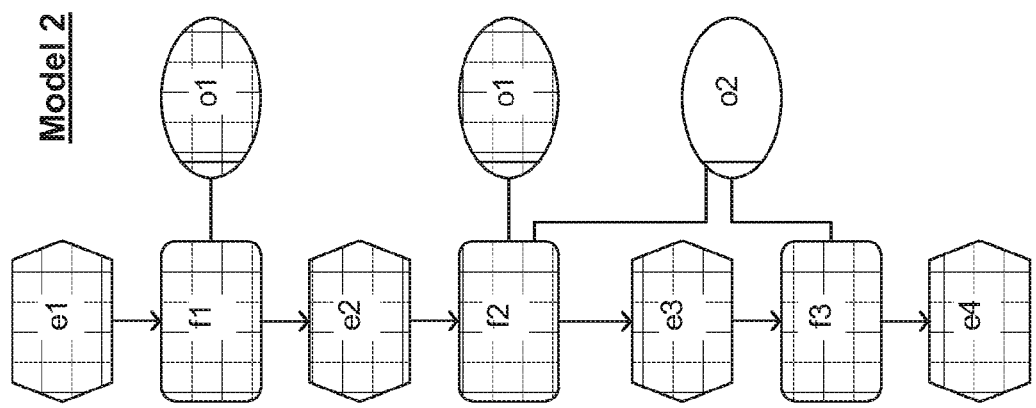
Figure 10B:
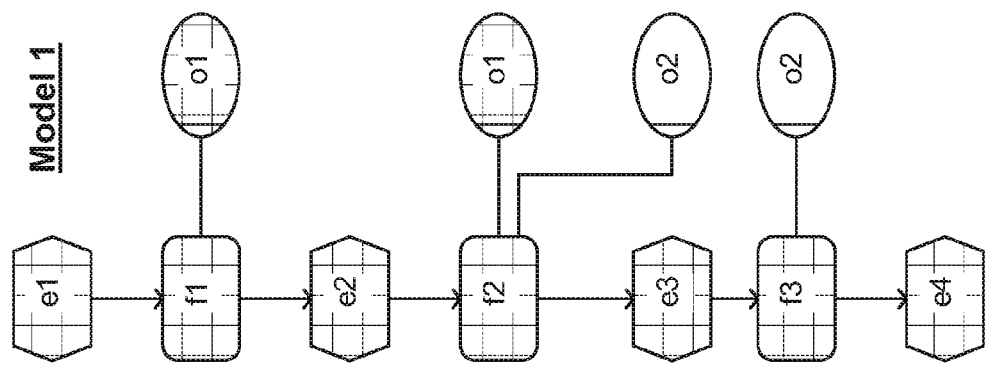

Performing sub-step 3 enables the identification of the corresponding two upper o1 elements, since they fulfill criterion I.A. By iterating over all pairs of left-right element sets, it is possible to then identify the upper left-right f1 elements. Then, it is possible to identify the two lower f1 elements, since the pair of unidentified f1 element sets now include only one element in the left and right side set (as in part III). By further iterations over sub-step 3, it is possible to identify e1, e2, f2, etc. At the end, all shaded elements in FIGS. 10*a* and 10*b* have been identified. The unidentified (un-shaded) elements o2 are marked as having been deleted and newly inserted.

As mentioned above, the assignee's current approach involves a comparison of size and top/left position of the elements. In the context of the algorithm of certain example embodiments presented above, this would take the place of sub-step 2. However, it has been determined that in the current approach, the identification of non-unique elements after applying different templates was difficult and not as accurate as the approach described herein.

In addition, in the assignee's current approach, there is no comparison similar to parts I and II in sub-step 3. Instead of these example parts, the following approach was implemented. The first element of the left element set was taken, and its neighbors were compared with the neighbors of all elements of the right element set. The corresponding element of element A was deemed found if the following criterion is fulfilled: Exactly one element of the right element set has neighbors that are all identified, and the left comparison element also has all these identified neighbors; furthermore, no other element of the left element set has these identified neighbors.

This criterion and the absence of the vice-versa or reverse check (in part II) caused several problems. As a first example problem, consider the immediately prior example, starting with sub-step 3 as shown in FIGS. 9*a* and 9*b*. Because no o1 element has only identified neighbors, the identification is already at the end, and all other elements beside k0 inappropriately are marked as new and deleted.

Figure 11:
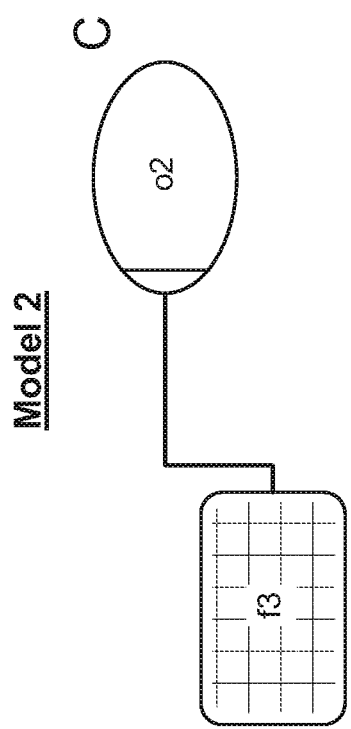
FIGS. 11-14 help demonstrate existing problems that certain example approaches described herein helps avoid.
Figure 11:
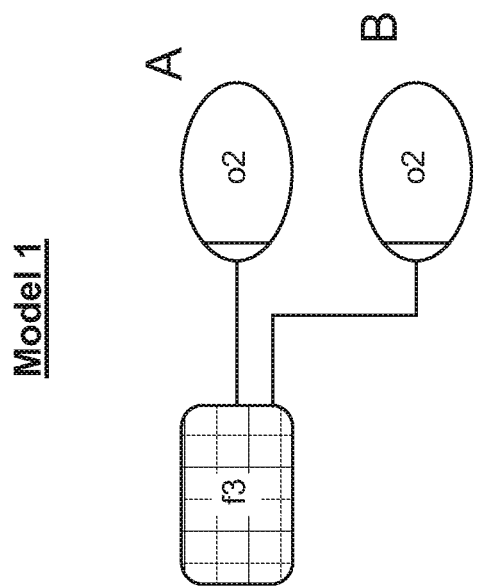
Figure 12:
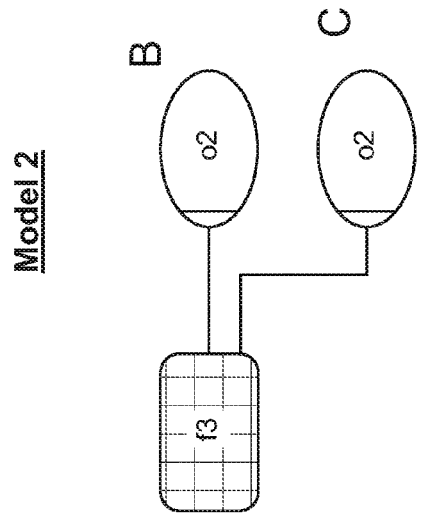
Figure 12:
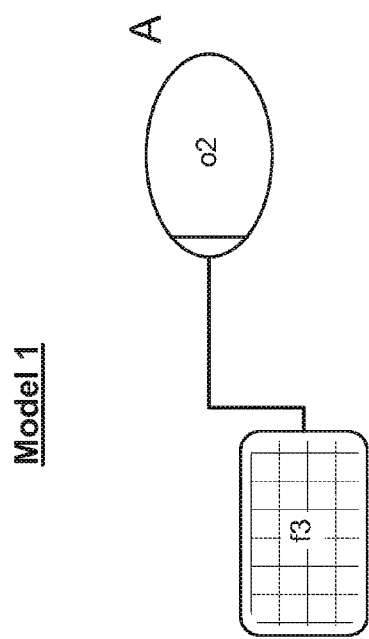
Figure 13:
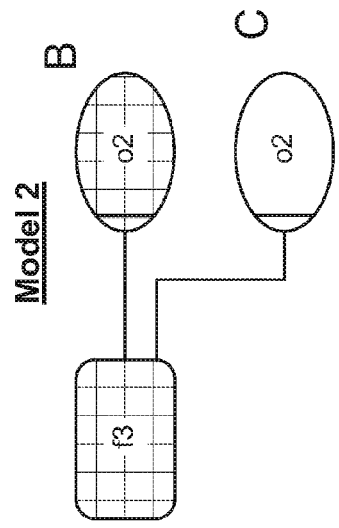
Figure 13:
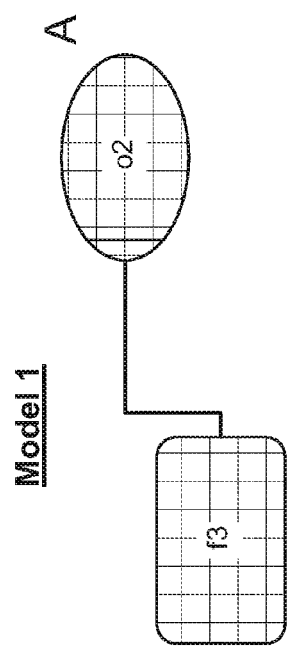

Another example problem arose in connection with the example models shown in FIG. 11. To determine, if A or B corresponds to C, A-C is first tested. It is determined that C fulfills the criterion that all neighbors are identified, but because occurrence B has the same identified neighbor as A, an identification by the old criterion is not possible. This behavior is correct and comes to the same result as the inventive approach described herein. However, if the models are switched as shown in FIG. 12, the current identification algorithm comes to a different result. Element A is compared with B, and the criterion of all identified neighbors is fulfilled. Furthermore, there are no other unidentified elements o2 in the left model that have the same neighbors. Thus, the algorithm comes to the strange result shown in FIG. 13, with identical elements being shaded. Because there was no vice-versa or reverse comparison in the old comparison algorithm, the comparison was non-deterministic and results could vary based on the direction of the element comparison.

Figure 14:
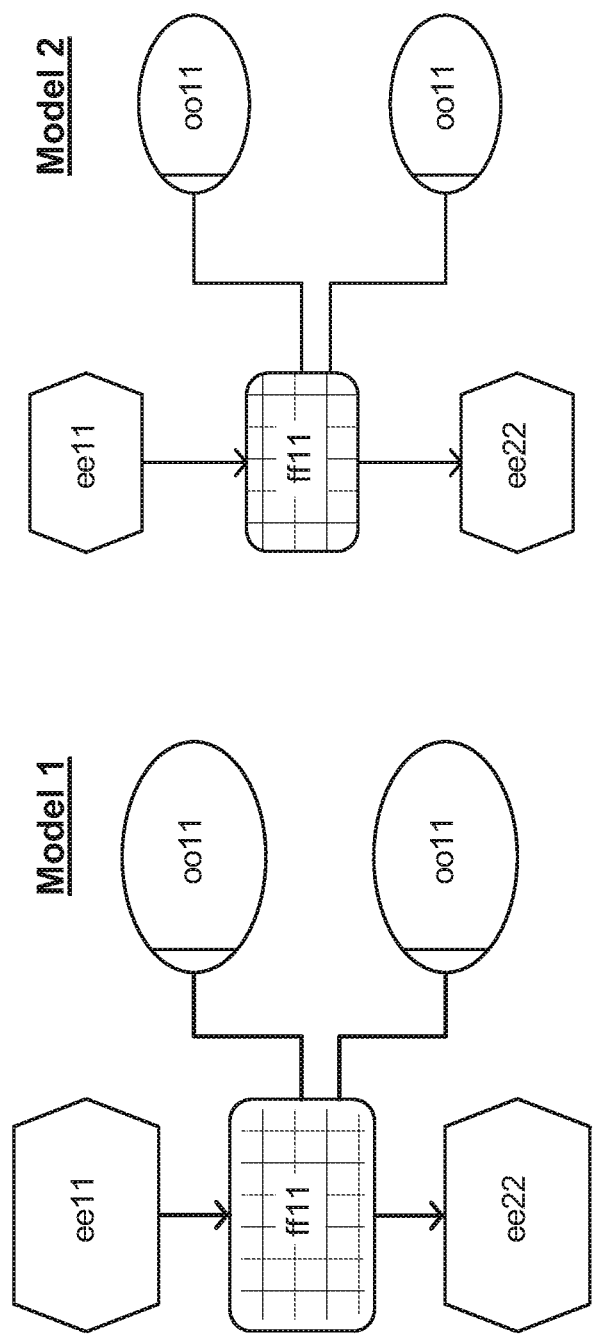

A third example problem relates to identical models with different design templates, e.g., as shown in connection with FIG. 14. Because the size and top/left position of the elements has been changed, the four oo11 elements could not be identified by the current algorithm, and the final result correctly identified the ee11, ff11, and ee22 elements, but marked the left model's oo11 elements as deleted and the right model's oo11 elements as newly added. By contrast, certain example embodiments may compare the center-points of the elements. Thus, a more correct identification of all elements may be possible.

As alluded to above, it would be desirable to compare more than just two models in certain circumstances. The example techniques described herein may be adapted to support this approach.

For example, for comparing three models with each other, triples (instead of pairs) of model elements with identical identifier would be built. Condition 1 and 2 (e.g., comparison of OIDs and element positions) may be fulfilled for three models, if elements with same identifier are found in all of the three element-sets, which have the same OID or position.

Condition 3 (comparison of neighbor elements) may be adapted by comparing three models. In this case, all three element sets may be compared in pairs as described in parts I.A or I.B. In this case, the neighbors of the element of the first model are first compared with the neighbor-elements of the second element set. Then, the first element set is compared with the third element set. Lastly, the second element set is compared with the third element set. If exactly one element has been identified in every element set, then these three elements may be considered corresponding.

The rest of the algorithm may be equivalent to the comparison of just two models (iteration over all element sets if any element has been identified as corresponding during the last iteration).

It will be appreciated that these general extension techniques may be applied to expand the approach described above so that it is suitable for comparing yet more models.

Although certain example embodiments have been described in connection with the ARIS modeling environment, other modeling tools, systems, languages, visual representations, etc., may be used in connection with different example embodiments. Thus, while certain example embodiments may use an OID in connection with ARIS-related implementations, other example embodiments may use other identifiers such as, for example, GUIDs, names, and/or the like, alone or in any suitable combination.

Figure 15:
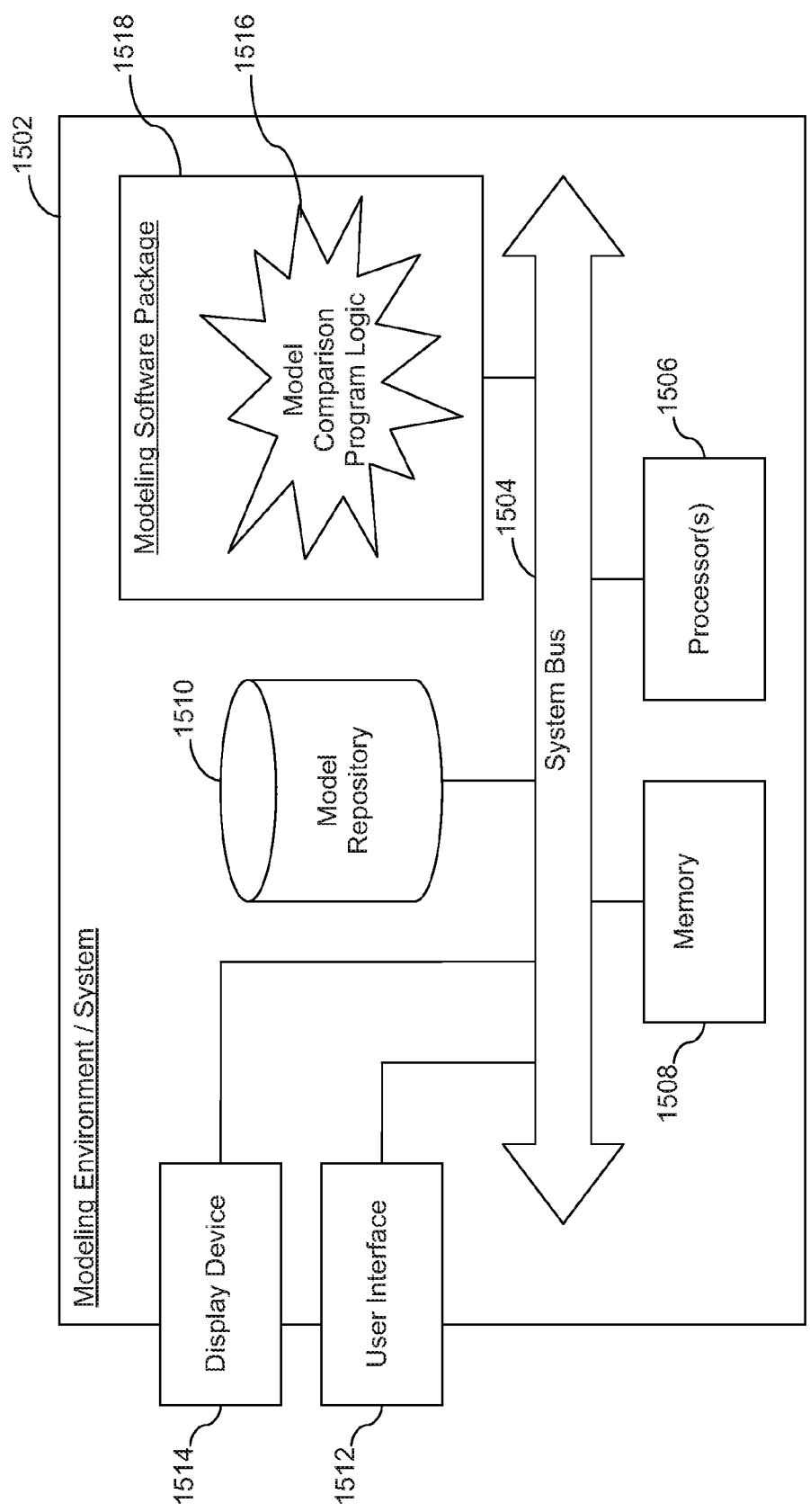
FIG. 15 is an example system diagram illustrating components that may be used in connection with certain example embodiments.

FIG. 15 is an example system diagram illustrating components that may be used in connection with certain example embodiments. The FIG. 15 example modeling environment 1502 includes a system bus 1504 to which a plurality of components are connected. For example, at least one processor 1506 and a memory (e.g., RAM) 1508 are connected to the system bus 1504. A model repository 1510 stores one or more user-defined models, which may be models of business and/or technical requirements, etc. These models may be stored according to a suitable metamodel together with or separate from associated metadata. A user may interact with the example system 1502, e.g., by using a user interface 1512 to create, edit, delete, exchange, and/or take other action(s) with respect to models stored in the model repository 1510, for instance, by executing modeling software stored within and/or executable from the environment 1502. In certain example embodiments, modeling software may be accessed from a remote location, e.g., over a suitable network connection. The user may elect to run model comparison program logic 1516, which may be integrated into the modeling software in certain example embodiments. In other example embodiments, the model comparison program logic 1516 may be a more standalone software tool accessible to the user. As shown in the FIG. 15 example embodiment, the model comparison program logic 1516 is a part of the modeling software package 1518. The modeling software package 1518 itself may be stored on a non-transitory computer readable storage medium. Thus, as alluded to above, the non-transitory computer readable storage medium tangibly storing modeling software package 1518 and/or the model comparison program logic 1516 may be a part of the modeling environment/computer system 1502, it may be accessible over a suitable network connection, or the like. The model comparison program logic 1516 may include instructions that when executed by the processor(s) 1506 operate together with the memory 1508 to run comparisons on two or more models stored in the model repository 1510, e.g., upon a suitable request received from the user via the user interface 1512, with the output optionally being displayed via the display device 1514.

Although certain examples above have been discussed in terms of "left" or "right" models, it will be appreciated that different implementations of the example embodiments disclosed herein may organize models according to different spatial relationships. For instance, models may be arranged vertically, horizontally, in a stacked or card-like arrangement, and/or in any suitable combination thereof.

As alluded to above, the models may be designed and/or represented according to any suitable modeling language or metamodel. EPC, BPMN, UML, ER, and/or the like may be used in connection with different example embodiments.

Example code snippets for certain function methods are provided below. These example code snippets may be used for handling non-unique objects, identifying corresponding elements, and identifying corresponding elements by a neighbor check.

```
/**
 * identifies objects with same GUIDs or Text-Attribute as Identifier
 * @param firstModelGUIDMap            maps the GUID-Identifier to a
set of elements of the first model
 * @param secondModelGUIDDMap          maps the GUID-Identifier to a
set of elements of the second model
 * @param firstModelGUIDMapToName      maps a GUID-Identifier to a
Text attribute (most likely the name attribute)
 * @param firstModelNameMapToElementSet   corresponds to the
firstModelGUIDMap parameter; maps a text-attribute to a
 *                                     set of elements of the first
model, which have all the same text-identifier
 * @param secondModelNameMapToElementSet  corresponds to the
secondModelGUIDMap parameter; maps a text-attribute to a
 *                                     set of elements of the second
model, which have all the same text-identifier
 * @param identifiedElementsFirstModel    elements of the first model,
which are already identified; either with a
 *                                     corresponding element in the
second model or identified as new in the first model
 * @param identifiedElementsSecondModel   elements of the second model,
```

```
                                                    -continued
which are already identified; either with a
 *                                                  corresponding element in the
first model or identified as new in the second model
 * @param elementsOnlyInFirstModel                  elements which are identified
as "new" in the first model
 */
  private void handleNonUniqueObjects(              Map<IGUID, Set<IDesignerHasOID>>
firstModelGUIDMap,
                                                    Map<IGUID, Set<IDesignerHasOID>>
secondModelGUIDMap,
                                                    Map<IGUID, String>
firstModelGUIDMapToName,
                                                    Map<String, Set<IDesignerHasOID>>
firstModelNameMapToElementSet,
                                                    Map<String, Set<IDesignerHasOID>>
secondModelNameMapToElementSet,
                                                    Set<IDesignerHasOID>
identifiedElementsFirstModel,
                                                    Set<IDesignerHasOID>
identifiedElementsSecondModel,
                                                    ArrayList<IDesignerHasOID>
elementsOnlyInFirstModel) {
     boolean bFinish = false;
     boolean bIdentifiedSomething;
     boolean bLastRun = false;
     do{
        bIdentifiedSomething = false;
        for (IGUID guidFirstSide : firstModelGUIDMap.keySet( )) {
           Set<IDesignerHasOID> firstSideObjectOccSet =
firstModelGUIDMap.get(guidFirstSide);
           Set<IDesignerHasOID> secondSideObjectOccSet=
secondModelGUIDMap.get(guidFirstSide);
           firstSideObjectOccSet.removeAll(identifiedElementsFirstModel);
           if (firstSideObjectOccSet.isEmpty( )) {
              // unique object - corresponding element(s) found
              continue;
           }
           if(secondSideObjectOccSet!=null) {
secondSideObjectOccSet.removeAll(identifiedElementsSecondModel);
           }
           boolean bTextComparisonIsUnique = true;
           if (secondSideObjectOccSet == null) {
              // no elment with the same GUID-Identifier in the set of the
second model,
              // So test, if a String-attribute is the comparison-ientifier
              if(compareTextAttribute(firstModelGUIDMapToName,
guidFirstSide)) {
                 String name = firstModelGUIDMapToName.get(guidFirstSide);
                 if(secondModelNameMapToElementSet.containsKey(name)) {
                    secondSideObjectOccSet   =
secondModelNameMapToElementSet.get(name);
                    firstSideObjectOccSet    =
firstModelNameMapToElementSet.get(name);
                    if(secondSideObjectOccSet.size( )==1 &&
firstSideObjectOccSet.size( )==1) {
                       // just one element in the first and second model
with the same text-attribute
                       // -> both elements identified as corresponding
                       bTextComparisonIsUnique = true;
                    }
secondSideObjectOccSet.removeAll(identifiedElementsSecondModel);
firstSideObjectOccSet.removeAll(identifiedElementsFirstModel);
                 }
              }
              if(secondSideObjectOccSet==null) {
                 elementsOnlyInFirstModel.addAll(firstSideObjectOccSet);
                 continue;
              }
           }
           for(int nPassNumber=1; nPassNumber<=4; ++nPassNumber) {
              // make three passes: 1. identifying by OID; 2. by Position ;
3. by Neighbors
              HashSet<IDesignerHasOID> oidsFirstSideToRemove = new
HashSet<IDesignerHasOID>( );
              for (Iterator<IDesignerHasOID> it =
firstSideObjectOccSet.iterator( ); it.hasNext( );) {
                 IDesignerHasOID firstSideObjectOcc = it.next( );
                 IDesignerHasOID secondSideObjectOcc=null;
                 if(bTextComparisonIsUnique &&
```

-continued

```
firstSideObjectOccSet.size( )==1 && secondSideObjectOccSet.size( )==1) {
            // if modelcomparison is by NAME and first and second
element is unique -> take these two
            secondSideObjectOcc =
secondSideObjectOccSet.toArray(new IDesignerHasOID[1])[0];
        } else {
            if(nPassNumber<=3) {
                // perform one of the three identification-steps
                secondSideObjectOcc =
identifyCorrespondingElement(firstSideObjectOcc, firstSideObjectOccSet,
secondSideObjectOccSet, nPassNumber, false);
            }
        }
        if (secondSideObjectOcc != null) {
            // leftObjectOcc matches rightObjectOcc
            identifiedElementsSecondModel.add(secondSideObjectOcc);
            identifiedElementsFirstModel.add(firstSideObjectOcc);
if(firstModelGUIDMap.equals(m_GUIToDesignerElementsMapLeft)) {
                addToLeftAndRight(firstSideObjectOcc,
secondSideObjectOcc);
            } else {
                addToLeftAndRight(secondSideObjectOcc,
firstSideObjectOcc);
            }
            oidsFirstSideToRemove.add(firstSideObjectOcc);
            secondSideObjectOccSet.remove(secondSideObjectOcc);
            bIdentifiedSomething = true;
        } else {
            if(nPassNumber==4 && bLastRun) {
                // all identification steps are done and no element
was identified as corresponding in the last iteration ...
identifiedElementsFirstModel.add(firstSideObjectOcc);
                elementsOnlyInFirstModel.add(firstSideObjectOcc);
            }
        }
    }
    firstSideObjectOccSet.removeAll(oidsFirstSideToRemove);
    }
}
if(bLastRun) {
    bFinish = true;
}
if(!bIdentifiedSomething) {
    // make one additional iteration and mark objects then as "new" in
the forth identification step,
    // because it can be that by identification an other element later
in the iteration, you can then
    // identify the first element by neighbor-check
    bLastRun = true;
}
} while(!bFinish);
}
/**
 * try to identify the corresponding element
 * @param testElementOfTheFirstModel                : one of the elements of
the second model, which has also the identical identifier;
 *                                                   this element is part of
"elementsWithSameIdentifierOfSecondModel" and for this element,
 * @param elementsWithSameIdentifierOfFirstModel    : elements of the first
model with the same identifier
 * @param elementsWithSameIdentifierOfSecondModel   : elements of the second
model with the same identifier
 * @param nPassNumber                               : 1. Pass: check OIDs, 2.
Pass: check Position; 3. Pass: check Neighbors
 * @param bCheckIdentifierAgain                     : false (only true, if
elements which are to identify are no objects, like GFX elements...)
 * @return                                          : null if no corresponding
element is found; otherwise the corresponding element
 */
private IDesignerHasOID identifyCorrespondingElement(IDesignerHasOID
testElementOfTheFirstModel, Set<IDesignerHasOID>
elementsWithSameIdentifierOfFirstModel,
                                                    Set<IDesignerHasOID>
elementsWithSameIdentifierOfSecondModel, int nPassNumber, boolean
bCheckIdentifierAgain) {
    IDesignerHasOID matchedOcc = null;
    // step 2: check oid's
    if(nPassNumber==1) {
        matchedOcc = checkOid(elementsWithSameIdentifierOfSecondModel,
testElementOfTheFirstModel);
```

```
        }
        // step 2: check position
        if(nPassNumber==2) {
            matchedOcc =
checkCenterPoint((IDesignerHasUnion)testElementOfTheFirstModel,
elementsWithSameIdentifierOfSecondModel);
        }
        // step 3: check connected neighbors
        if(nPassNumber==3 && testElementOfTheFirstModel instanceof IDesignerObjOcc)
{
            IDesignerObjOcc objOccFirst = (IDesignerObjOcc)
testElementOfTheFirstModel;
            IDesignerHasOID matchingObjectOccInSecondModel =
identifyCorrespondingElementByNeighbourCheck(objOccFirst,
elementsWithSameIdentifierOfSecondModel, bCheckIdentifierAgain);
            if(matchingObjectOccInSecondModel!=null) {
                // if there is one potentially matching element, test the other
direction vice versa
            IDesignerHasOID matchingObjectOccInFirstModel =
identifyCorrespondingElementByNeighbourCheck((IDesignerObjOcc)
matchingObjectOccInSecondModel, elementsWithSameIdentifierOfFirstModel,
bCheckIdentifierAgain);
                if(matchingObjectOccInFirstModel!=null &&
objOccFirst.equals(matchingObjectOccInFirstModel)) {
                    // corresponding elements found by neighbor-check
                    matchedOcc = matchingObjectOccInSecondModel;
                }
            }
        }
        // find corresponding connections; they are corresponding if its source and
target objcts are corresponding
        if(nPassNumber==3 && testElementOfTheFirstModel instanceof
IDesignerCxnOccBase) {
            IDesignerCxnOccBase cxnOcc = (IDesignerCxnOccBase)
testElementOfTheFirstModel;
            matchedOcc = checkSourceAndTarget(cxnOcc,
elementsWithSameIdentifierOfSecondModel);
        }
        return matchedOcc;
    }
    /**
     * check if there is a corresponding connection of the connection
"connectionOccOfFirstModel" in the connection-set of the second model
     * @param connectionOccOfFirstModel        a connectino from the first model
with the same identifier
     * @param connectionOccsOfSecondModel      set of connections from the Second
model with the same identifier
     * @return                                 the corresponding connection from
the second-model-set to the given connection of the first model
     */
    private IDesignerHasOID checkSourceAndTarget(IDesignerCxnOccBase
connectionOccOfFirstModel, Set<IDesignerHasOID> connectionOccsOfSecondModel) {
        for (IDesignerHasOID elementSecondSide: connectionOccsOfSecondModel) {
            IDesignerCxnOccBase cxnOccSecondSide =
(IDesignerCxnOccBase)elementSecondSide;
            if(equals(cxnOccSecondSide, connectionOccOfFirstModel)
            && equals(cxnOccSecondSide.getDesignerSource( ),
connectionOccOfFirstModel.getDesignerSource( ))
            && equals(cxnOccSecondSide.getDesignerTarget( ),
connectionOccOfFirstModel.getDesignerTarget( )) ) {
                return cxnOccSecondSide;
            }
        }
        return null;
    }
    private IDesignerHasOID checkCenterPoint(IDesignerHasUnion elementOfFirstModel,
Set<IDesignerHasOID> elementSetOfSecondmodel) {
        Point center = new
Point((int)elementOfFirstModel.getBoundingBox( ).getCenterX( ),
(int)elementOfFirstModel.getBoundingBox( ).getCenterY( ));
        for (IDesignerHasOID object : elementSetOfSecondmodel) {
            IDesignerHasUnion otherObjOcc = (IDesignerHasUnion) object;
            Point otherCenter = new
Point((int)otherObjOcc.getBoundingBox( ).getCenterX( ),
(int)otherObjOcc.getBoundingBox( ).getCenterY( ));
            if (hasSameKind(elementOfFirstModel, object) &&
center.equals(otherCenter))
                return object;
        }
    }
```

```
    return null;
  }
  /**
   * tests for an element of the element set of the first model if there is a
corresponding element in the second's model element set with identical element-
identifiers
   * by checking the connections to neighbor-elemetns
   * @param testObjectOccFromFirstModel            : one element of
the first model-set which has also the same identifier
   *                                                and for which one
a corresponding element from the second-model-set is searched
   * @param objectOccsWithIdenticalIdentifierInSecondModel    : element set with
same identifier from second model
   * @param bCheckIdentifierAgain                  : false (only true,
if method is used for other elements like GFX elements)
   * @return                                       : null, if there is
no matching element, otherwise the best-matching element
   */
  private IDesignerHasOID
identifyCorrespondingElementByNeighbourCheck(IDesignerObjOcc
testObjectOccFromFirstModel, Set<IDesignerHasOID>
objectOccsWithIdenticalIdentifierInSecondModel, boolean bCheckIdentifierAgain) {
    List<IDesignerCxnOccBase> firstElementIncomingCxns =
asList(testObjectOccFromFirstModel.getIncomingCxns( ));
    List<IDesignerCxnOccBase> firstElementOutgoingCxns =
asList(testObjectOccFromFirstModel.getOutgoingCxns( ));
    int nMaxIdentifiedCxns = 0;
    boolean bFoundDouble = true;
    IDesignerHasOID objectOccWithBestMatching = null;
    ArrayList<IDesignerHasOID> objectsMatchingWithAllCxns = new
ArrayList<IDesignerHasOID>( );
    // iterate over all elements of the second model which have the same
identifier as the element of the first mo
    for (IDesignerHasOID objectOccFromSecondModel :
objectOccsWithIdenticalIdentifierInSecondModel) {
      if (objectOccFromSecondModel instanceof IDesignerObjOcc &&
!objectOccFromSecondModel.equals(testObjectOccFromFirstModel) &&
checkIfIdentifierIsEqual(bCheckIdentifierAgain, testObjectOccFromFirstModel,
objectOccFromSecondModel)) {
        IDesignerObjOcc secondObjOcc = (IDesignerObjOcc)
objectOccFromSecondModel;
        List<IDesignerCxnOccBase> secondElementIncomingCxns =
asList(secondObjOcc.getIncomingCxns( ));
        List<IDesignerCxnOccBase> secondElementOutgoingCxns =
asList(secondObjOcc.getOutgoingCxns( ));
        int cxnsIdentified=0;
        int cxnsNotIdentified=0;
        // if you have for example in the left and right element set
exactly one element without connected neighbors and the other elements with the
        // same identifier have neighbors, then take these two elements as
corresponding
if(secondElementIncomingCxns.size( )==firstElementIncomingCxns.size( ) &&
secondElementOutgoingCxns.size( )==firstElementOutgoingCxns.size( )
        && firstElementIncomingCxns.size( )==0 &&
firstElementOutgoingCxns.size( )==0) {
          cxnsIdentified++;
        }
        // iterate over the incoming connections and count the matching/not
matching connections
        for (Iterator<IDesignerCxnOccBase> it =
secondElementIncomingCxns.iterator( ); it.hasNext( );) {
          IDesignerCxnOccBase secondIncomingCxn = it.next( );
          IDesignerCxnOccBase matchingCxn =
getMatchingCxn(secondIncomingCxn, secondObjOcc, firstElementIncomingCxns,
testObjectOccFromFirstModel);
          if (matchingCxn != null) {
            cxnsIdentified++;
          } else {
            cxnsNotIdentified++;
          }
        }
        // iterate over the outgoing connections and count the matching/not
matching connections
        for (Iterator<IDesignerCxnOccBase> it =
secondElementOutgoingCxns.iterator( ); it.hasNext( );) {
          IDesignerCxnOccBase secondOutgoingCxn = it.next( );
          IDesignerCxnOccBase matchingCxn =
getMatchingCxn(secondOutgoingCxn, secondObjOcc, firstElementOutgoingCxns,
testObjectOccFromFirstModel);
          if (matchingCxn != null) {
```

```
            cxnsIdentified++;
         } else {
            cxnsNotIdentified++;
         }
      }
      if(cxnsNotIdentified==0 && cxnsIdentified>0) {
         // all connections have matching corresponding connecitons
         objectsMatchingWithAllCxns.add(objectOccFromSecondModel);
      }
      if(cxnsIdentified == nMaxIdentifiedCxns) {
         // if there is an other element with the same count of matching
connecionts/neighbors, a unique identification will not be possible
         bFoundDouble = true;
      }
      if(cxnsIdentified > nMaxIdentifiedCxns) {
         // actual tested element of the second model has the best
matching up to now
         nMaxIdentifiedCxns = cxnsIdentified;
         objectOccWithBestMatching = objectOccFromSecondModel;
         bFoundDouble = false;
      }
   }
}
if(!bFoundDouble) {
   return objectOccWithBestMatching;            // first criterion: one element
has the maximum account of connections which are matching with the connections of
the comparison element
} else {
   if(objectsMatchingWithAllCxns.size( )==1) {              // second criterion: only
element matches exactly with all its connections in comparison to the connections
of the comparison element
      return objectsMatchingWithAllCxns.get(0);
   }
   else {
      return null;
   }
}
}
```

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method for comparing first and second computer-represented models, each said model having a plurality of elements and each said element having an identifier, the method comprising:

building, via at least one processor, sets of elements from the first and second models such that all elements in a given set have identical identifiers;

for each set of elements:

when the set includes exactly one element from each of the first and second models, marking these elements as corresponding with one another;

when the set includes at least one entry for the first model and no entries for the second model, marking the at least one entry for the first model as having been deleted;

when the set includes at least one entry for the second model and no entries for the first model, marking the at least one entry for the second model as having been added;

when the set includes more than one element for either or both of the first and second models, for each element in the set from the first model:

comparing an additional identifier of the element in the set from the first model to all additional identifiers of the elements in the set from the second model;

when there is exactly one element from the second model that has the same additional identifier as the identifier of the element from the first model, marking the first and second elements as corresponding with one another and proceeding to the next element in the set from the first model, if any;

in situations where (i) there are no elements from the second model set that have the same additional identifier as the identifier of the element from the first model, and in situations where (ii) there are multiple elements from the second model that have the same additional unique identifier as the identifier of the element from the first model:

comparing a position of the element from the first model with positions of the elements from the second model, if any;

when there is exactly one element from the second model that has the same position as the element from the first model, marking the first and second elements as corresponding with one another and proceeding to the next element in the set from the first model, if any;

comparing neighbors of the element from the first model (if any) with neighbors of each elements from the second model (if any);

determining whether (a1) exactly one element from the second model has more identified neighbors than other elements from the second model and these neighbors correspond to neighbors of the element from the first model;

determining, when part (a1) is not fulfilled, whether (b1) exactly one element of the second model has neighbors that are all identified and the first element also has these neighbors identified as corresponding neighbors;

in situations where neither (a1) nor (b1) apply, proceeding to the next element in the set from the first model, if any;

in situations where (a1) or (b1) applies:

determining whether (a2) exactly one element from the first model has more identified neighbors than other elements from the first model and these neighbors correspond to neighbors of the element from the second model;

determining, when part (a2) is not fulfilled, whether (b2) exactly one element of the first model has neighbors that are all identified and the second element also has these neighbors identified as corresponding neighbors;

in situations where neither (a2) nor (b2) apply, proceeding to the next element in the set from the first model, if any;

in situations where (a2) or (b2) applies, comparing this element from the first model with the actual element from the first model being tested in this iteration and, when they are the same element, marking the element from the first and second models as corresponding to one another, but when this is not the case, proceeding to the next element in the set from the first model, if any; and when all sets have been examined, determining whether any element could not be identified as corresponding during the last iteration; and when at least one correspondence was identified, repeating the iterations over all sets.

2. The method of claim 1, wherein at least some of the identifiers are non-unique within a given model.

3. The method of claim 1, wherein the positions that are compared are center positions of the elements.

4. The method of claim 1, further comprising applying a layout or design template to the first and/or second models to adjust ways in which some or all elements of one or both models are displayed.

5. The method of claim 1, wherein the second model is a different version of the first model.

6. The method of claim 1, wherein the second model is created from a merge operation performed on the first model.

7. The method of claim 1, wherein the second model is a copy and subsequent alteration of the first model.

8. The method of claim 1, wherein the models are EPC or BPMN models.

9. A non-transitory computer-readable storage medium tangibly storing instructions that, when executed by at least one processor of a modeling system, perform at least the following:

building sets of elements from first and second computer-represented models each comprising a plurality of model elements such that all elements in a given set have identical identifiers;

for each set of elements:

when the set includes exactly one element from each of the first and second models, marking these elements as corresponding with one another;

when the set includes at least one entry for the first model and no entries for the second model, marking the at least one entry for the first model as having been deleted;

when the set includes at least one entry for the second model and no entries for the first model, marking the at least one entry for the second model as having been added;

when the set includes more than one element for either or both of the first and second models, for each element in the set from the first model:

comparing an additional identifier of the element in the set from the first model to all additional identifiers of the elements in the set from the second model;

when there is exactly one element from the second model that has the same additional identifier as the identifier of the element from the first model, marking the first and second elements as corresponding with one another and proceeding to the next element in the set from the first model, if any;

in situations where (i) there are no elements from the second model set that have the same additional identifier as the identifier of the element from the first model, and in situations where (ii) there are multiple elements from the second model that have the same additional unique identifier as the identifier of the element from the first model:

comparing a position of the element from the first model with positions of the elements from the second model, if any;

when there is exactly one element from the second model that has the same position as the element from the first model, marking the first and second elements as corresponding with one another and proceeding to the next element in the set from the first model, if any;

comparing neighbors of the element from the first model (if any) with neighbors of each elements from the second model (if any);

determining whether (a1) exactly one element from the second model has more identified neighbors than other elements from the second model and these neighbors correspond to neighbors of the element from the first model;

determining, when part (a1) is not fulfilled, whether (b1) exactly one element of the second model has neighbors that are all identified and the first element also has these neighbors identified as corresponding neighbors;

in situations where neither (a1) nor (b1) apply, proceeding to the next element in the set from the first model, if any;

in situations where (a1) or (b1) applies:
   determining whether (a2) exactly one element from the first model has more identified neighbors than other elements from the first model and these neighbors correspond to neighbors of the element from the second model;
   determining, when part (a2) is not fulfilled, whether (b2) exactly one element of the first model has neighbors that are all identified and the second element also has these neighbors identified as corresponding neighbors;
   in situations where neither (a2) nor (b2) apply, proceeding to the next element in the set from the first model, if any;
   in situations where (a2) or (b2) applies, comparing this element from the first model with the actual element from the first model being tested in this iteration and, when they are the same element, marking the element from the first and second models as corresponding to one another, but when this is not the case, proceeding to the next element in the set from the first model, if any; and
when all sets have been examined, determining whether any element could not be identified as corresponding during the last iteration; and
when at least one correspondence was identified, repeating the iterations over all sets.

10. The non-transitory computer-readable storage medium of claim 9, wherein at least some of the identifiers are non-unique within a given model.

11. The non-transitory computer-readable storage medium of claim 9, wherein the positions that are compared are center positions of the elements.

12. The non-transitory computer-readable storage medium of claim 9, wherein further instructions are provided for applying a layout or design template to the first and/or second models to adjust ways in which some or all elements of one or both models are displayed.

13. The non-transitory computer-readable storage medium of claim 9, wherein the second model is a different version of the first model.

14. The non-transitory computer-readable storage medium of claim 9, wherein the second model is created from a merge operation performed on the first model.

15. The non-transitory computer-readable storage medium of claim 9, wherein the second model is a copy and subsequent alteration of the first model.

16. The non-transitory computer-readable storage medium of claim 9, wherein the models are EPC or BPMN models.

17. A modeling system, comprising:
processing resources including a processor and a memory;
a model repository storing a plurality of computer-based models, each said model including a plurality of model elements; and
a user interface configured to receive user input;
wherein the processor is configured to receive user input from the user interface; and
wherein when the user input indicates that the processing resources are to retrieve first and second models from the model repository and compare the two, a comparison is performed by executing instructions for at least:
   building sets of elements from the first and second models such that all elements in a given set have identical identifiers;
   for each set of elements:
      when the set includes exactly one element from each of the first and second models, marking these elements as corresponding with one another;
      when the set includes at least one entry for the first model and no entries for the second model, marking the at least one entry for the first model as having been deleted;
      when the set includes at least one entry for the second model and no entries for the first model, marking the at least one entry for the second model as having been added;
      when the set includes more than one element for either or both of the first and second models, for each element in the set from the first model:
         comparing an additional identifier of the element in the set from the first model to all additional identifiers of the elements in the set from the second model;
         when there is exactly one element from the second model that has the same additional identifier as the identifier of the element from the first model, marking the first and second elements as corresponding with one another and proceeding to the next element in the set from the first model, if any;
         in situations where (i) there are no elements from the second model set that have the same additional identifier as the identifier of the element from the first model, and in situations where (ii) there are multiple elements from the second model that have the same additional unique identifier as the identifier of the element from the first model:
            comparing a position of the element from the first model with positions of the elements from the second model, if any;
            when there is exactly one element from the second model that has the same position as the element from the first model, marking the first and second elements as corresponding with one another and proceeding to the next element in the set from the first model, if any;
            comparing neighbors of the element from the first model (if any) with neighbors of each elements from the second model (if any);
            determining whether (a1) exactly one element from the second model has more identified neighbors than other elements from the second model and these neighbors correspond to neighbors of the element from the first model;
            determining, when part (a1) is not fulfilled, whether (b1) exactly one element of the second model has neighbors that are all identified and the first element also has these neighbors identified as corresponding neighbors;
            in situations where neither (a1) nor (b1) apply, proceeding to the next element in the set from the first model, if any;
            in situations where (a1) or (b1) applies:
               determining whether (a2) exactly one element from the first model has more identified neighbors than other elements from the first model and these neighbors correspond to neighbors of the element from the second model;
               determining, when part (a2) is not fulfilled, whether (b2) exactly one element of the first model has neighbors that are all identified and the second element also has these neighbors identified as corresponding neighbors;

in situations where neither (a2) nor (b2) apply, proceeding to the next element in the set from the first model, if any;

in situations where (a2) or (b2) applies, comparing this element from the first model with the actual element from the first model being tested in this iteration and, when they are the same element, marking the element from the first and second models as corresponding to one another, but when this is not the case, proceeding to the next element in the set from the first model, if any; and when all sets have been examined, determining whether any element could not be identified as corresponding during the last iteration; and when at least one correspondence was identified, repeating the iterations over all sets.

18. The system of claim 17, wherein at least some of the identifiers are non-unique within a given model.

19. The system of claim 17, wherein the positions that are compared are center positions of the elements.

20. The system of claim 17, wherein further instructions are provided for applying a layout or design template to the first and/or second models to adjust ways in which some or all elements of one or both models are displayed.

21. The system of claim 17, wherein the second model is a different version of the first model, created from a merge operation performed on the first model, or a copy and subsequent alteration of the first model.

22. The system of claim 17, wherein the models are EPC or BPMN models.

23. The system of claim 17, further comprising a display configured to display one or more models in the model repository when the user input receives user input requesting a corresponding display, and further configured to display results of the comparisons.

24. A computer-implemented method for comparing a plurality of computer-represented models, each said model having a plurality of elements and each said element having an identifier, the method comprising:

building, via at least one processor, sets of elements from the plurality of models such that all elements in a given set have identical identifiers;

for each set of elements:
when the set includes exactly one element from each of the plurality of models, marking these elements as corresponding with one another;

when the set includes at least one entry for one of the models and no entries for the other models, marking the at least one entry for that model as having been added or deleted, as appropriate;

otherwise, performing pair-wise comparisons between the plurality of models, and for each element in the set from a first model involved in the pair-wise comparison:

comparing the identifier of the element in the set from the first model to all identifiers of the elements in the set from a second model;

when there is exactly one element from the second model that has the same identifier as the identifier of the element from the first model, marking the first and second elements as corresponding with one another and proceeding to the next element in the set from the first model, if any;

in situations where (i) there are no elements from the second model set that have the same identifier as the identifier of the element from the first model, and in situations where (ii) there are multiple elements from the second model that have the same identifier as the identifier of the element from the first model:

comparing a position of the element from the first model when positions of the elements from the second model, if any;

when there is exactly one element from the second model that has the same position as the element from the first model, marking the first and second elements as corresponding with one another and proceeding to the next element in the set from the first model, if any;

comparing neighbors of the element from the first model (if any) with neighbors of each elements from the second model (if any);

determining whether (a1) exactly one element from the second model has more identified neighbors than other elements from the second model and these neighbors correspond to neighbors of the element from the first model;

determining, when part (a1) is not fulfilled, whether (b1) exactly one element of the second model has neighbors that are all identified and the first element also has these neighbors identified as corresponding neighbors;

in situations where neither (a1) nor (b1) apply, proceeding to the next element in the set from the first model, if any;

in situations where (a1) or (b1) applies:
determining whether (a2) exactly one element from the first model has more identified neighbors than other elements from the first model and these neighbors correspond to neighbors of the element from the second model;

determining, when part (a2) is not fulfilled, whether (b2) exactly one element of the first model has neighbors that are all identified and the second element also has these neighbors identified as corresponding neighbors;

in situations where neither (a2) nor (b2) apply, proceeding to the next element in the set from the first model, if any;

in situations where (a2) or (b2) applies, comparing this element from the first model with the actual element from the first model being tested in this iteration and, when they are the same element, marking the element from the first and second models as corresponding to one another, but when this is not the case, proceeding to the next element in the set from the first model, if any; and when all sets have been examined, determining whether any element could not be identified as corresponding during the last iteration; and when at least one correspondence was identified, repeating the iterations over all sets in the remaining pair-wise comparisons, wherein at least three models are provided in the plurality of models.

25. A non-transitory computer-readable storage medium tangibly storing instructions that, when executed by at least one processor of a modeling system, perform the method of claim 24.

26. A modeling system, comprising:
processing resources including a processor and a memory;
a model repository storing a plurality of computer-based models, each said model including a plurality of model elements; and
a user interface configured to receive user input;
wherein the processor is configured to receive user input from the user interface; and
wherein when the user input indicates that the processing resources are to retrieve a plurality of models the model repository for comparison purposes, the modeling system is caused to execute the instructions tangibly stored on the non-transitory computer-readable storage medium of claim 25.

* * * * *